United States Patent

Myers

[11] Patent Number: 6,005,462
[45] Date of Patent: Dec. 21, 1999

[54] ELECTROMAGNETIC CORE-ENERGY ACTUATOR

[76] Inventor: John Leonard Myers, 20 E. Floral Acres Dr., Tipp City, Ohio 45371-2914

[21] Appl. No.: 09/028,601

[22] Filed: Feb. 24, 1998

[51] Int. Cl.⁶ .................................................. H01F 7/08
[52] U.S. Cl. .......................... 335/220; 335/266; 335/230
[58] Field of Search ................................. 335/220, 221, 335/222, 228, 229, 230–4, 242, 246, 248, 256, 266

[56] References Cited

U.S. PATENT DOCUMENTS

| | | | |
|---|---|---|---|
| 4,211,992 | 7/1980 | Gaskill, Jr. | 335/222 |
| 4,242,658 | 12/1980 | Helinski | 335/237 |
| 4,390,856 | 6/1983 | Schechter | 335/256 |
| 4,422,060 | 12/1983 | Matsumoto et al. | 335/266 |
| 4,462,014 | 7/1984 | Montagu | 335/230 |
| 4,870,335 | 9/1989 | Koshida et al. | 335/229 |
| 4,908,592 | 3/1990 | Oudet | 335/229 |
| 5,091,710 | 2/1992 | Ohba et al. | 335/229 |
| 5,367,277 | 11/1994 | Kaidou | 335/229 |

*Primary Examiner*—Lincoln Donovan

[57] ABSTRACT

An electromagnetic actuator device converts electrical energy to mechanical energy by the interaction of two types of closed magnetic circuits. A first closed magnetic circuit functions to generate high magnetic intensity in a portion of a ferromagnetic core. A second substantially-closed magnetic circuit contains a movable permanent magnet which injects flux into the high-field region of the first magnetic circuit. Interaction of these two fields, in closed magnetic circuits, results in efficient and controllable electromechanical energy conversion.

24 Claims, 23 Drawing Sheets

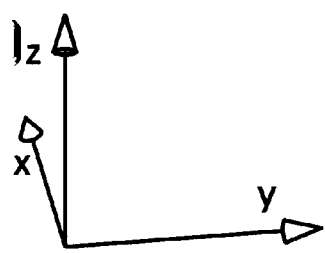
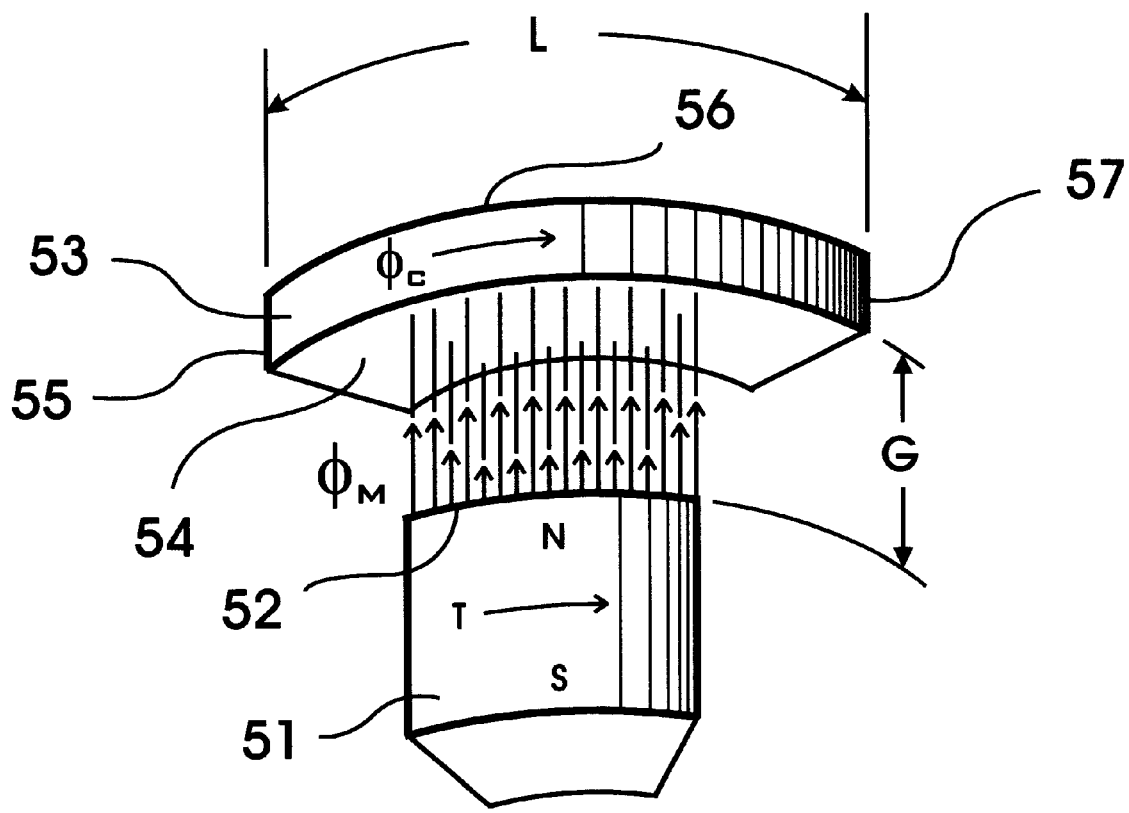

ELECTROMAGNETIC CORE-ENERGY ACTUATOR

BACKGROUND OF THE INVENTION

1. Field of the Invention

This invention relates to electromagnetic devices used to generate mechanical work output in response to an electrical input to one or more electromagnet coils. In particular, it relates to a class of devices using permanent magnets, in conjunction with the internal magnetic field energy of a ferromagnetic material, to affect efficient electromechanical energy conversion.

2. Description of the Prior Art

Actuators for converting electrical energy to mechanical energy have long been known and have been called solenoids, electromagnets, force motors, torque motors and various other names. The most common linear or rotary solenoid produces mechanical energy when an internal air gap decreases in length. Less common are the devices described in U.S. Pat. Nos. 3,870,931 and 4,097,833, in which an air gap of variable area converts electrical to mechanical energy. Unlike prior art, the object of the present invention is to utilize magnetic fields internal to a ferromagnetic core, with no substantial variation in either gap length or area. Another object is to utilize the large number of ferromagnetic material formulations which are available. Still another object is to customize the force or torque output by varying core characteristics. Other objects and advantages will become apparent from the following description.

SUMMARY OF THE INVENTION

The present invention includes energy conversion devices of high efficiency, capable of moving a mechanical load to discrete positions like a solenoid, or moving to a varying position as in a position servomechanism. It includes devices which use one energy-conversion cycle, like a solenoid, and multiple-conversion devices, like stepping motors and DC motors.

Electrical energy is received by an electromagnet. The electromagnet has one or more coils coupled to a closed magnetic core structure, which consists of sections of low magnetic reluctance to supply flux and sections of higher reluctance to develop a magnetic control field. A second substantially orthogonal magnetic field of a movable permanent magnet is injected into the high reluctance core section. This interacts with the control field to decrease field energy, and by the law of conservation of energy, output mechanical energy equals the field energy lost.

Thus, the energy conversion section of the present invention is seen to consist of a simple bar of ferromagnetic material, such as iron, along which one or more poles of a magnet travel. Since some bar surfaces are unencumbered, position and/or velocity sensing means can be easily implemented to produce a servo actuator. Also, since mechanical output is a function of the bar properties, a square-loop material can be used to provide not only hysteresis braking, but a holding force/torque at any position upon power removal. The composition and shape of the bar can be used to customize the mechanical output, including automatic return to a starting position when electrical power is removed. The inherent ease by which unit characteristics can be customized, sensed and controlled, results in a novel design having great versatility.

Variations of the design include those in which a magnet travels 1) along a straight bar, 2) along the inside diameter of an annular ring, 3) along the lateral surface of a washer, 4) along the inside diameter of a helix and 5) along the lateral, intercoil surface of a helix. The first 3 design types are preferred, since mechanical losses tend to increase with longer angular travel. Angular designs with more than one revolution should use design type 2 or 3 and a mechanical converter means, such as a set of gears or pulleys.

A first object of the present invention is to provide a limited-travel device consisting of a single input coil set, combined with a bar, ring or washer. A second object is to provide a device with unlimited travel, using a plurality of coil sets, spaced along the energy conversion cores, such that the areas of influence overlap. Sequential operation of coil sets provides stepped or continuous motion. Also, if self-commutated, the device can operate as a DC motor.

Other objects and advantages of the present invention will be apparent from the following description, the accompanying drawings and the appended claims.

BRIEF DESCRIPTION OF THE DRAWINGS

FIG. 3 is a drawing showing an annular magnetic core used with a permanent magnet for energy conversion in a rotary device of the present invention, wherein a magnet pole rotates in proximity to a lateral surface.

DETAILED DESCRIPTION OF THE INVENTION

The present invention relates to an electromechanical actuator for the conversion of electrical energy to mechanical energy. In this device, electrical energy is first supplied to the coil of an electromagnet, which converts a portion into magnetic field energy. Secondly, this magnetic field energy interacts with a movable member which is capable of modulating or changing field energy. By the law of conservation of energy, the change in field energy must exactly equal the the gross mechanical work output. In mathematical terminology, mechanical force output, in Newtons, is equal to the negative gradient of the field energy, in Joules per meter. This principle is fundamental to all electromechanical energy conversion devices, including the present invention.

Figure 1:
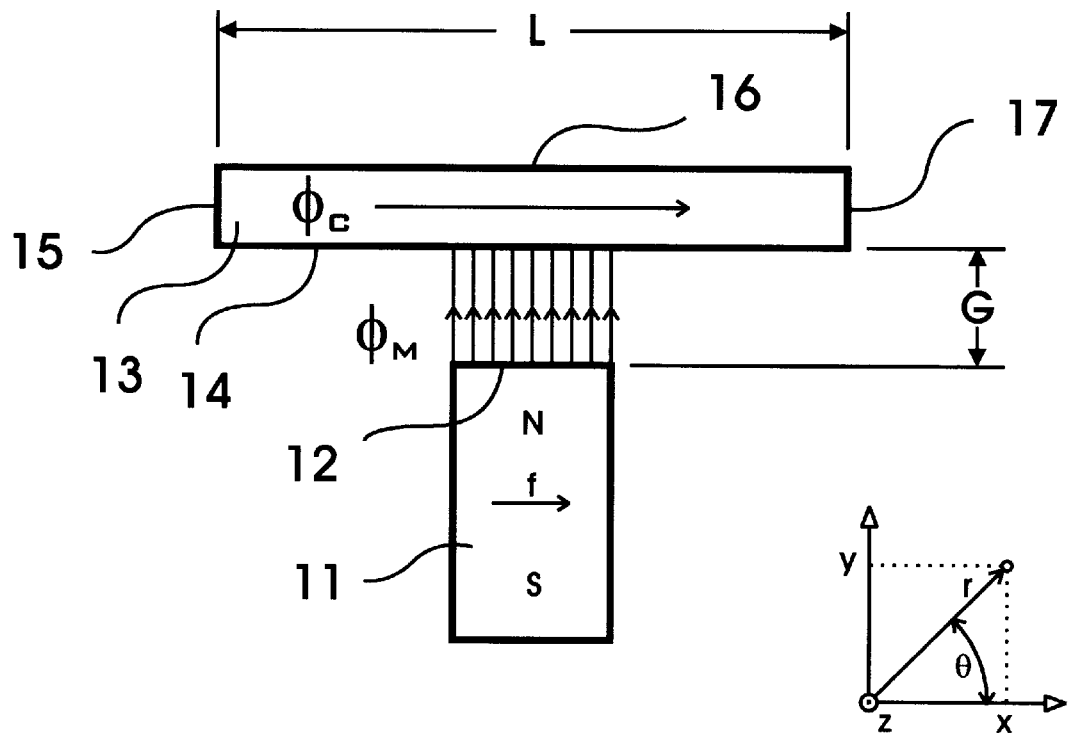
FIG. 1 is a drawing showing a straight magnetic core used with a permanent magnet for energy conversion in a linear device of the present invention.

Unlike conventional actuators, which use the modulated field energy of an air gap, the present invention modulates the internal field energy of a ferromagnetic core conversion element as shown in FIG. 1. Referring to FIG. 1, a first conversion element of the actuator consists of a ferromagnetic core 13 of length L, having bottom surface 14, top surface 16, and end surfaces 15 and 17 for receiving control-flux $\phi_c$. A second element is a permanent magnet or magnet assembly 11 having a north magnetic pole N and south magnetic pole S, having a flat surface 12 which injects flux $\phi_m$ substantially orthogonally into surface 14 of first element 13, and having motion constrained to a straight line as shown. For most ferromagnetic materials, accurate output calculations require nonlinear methods, but linear methods are sufficient to qualitatively determine the fundamental equation for force output:

Magnetic flux $\phi$, in Webers, equals the magnetomotive force F, in Amperes, divided by reluctance R, in Amperes per Weber, $$\phi = F/R, \text{ or } F = \phi R.$$

Assuming magnetic flux $\phi_m$ flows equally to the left and to the right in ferromagnetic core 13, flux in the core to the left is $$\phi_L = \phi_c - \phi_m/2,$$

and flux in the core to the right is $$\phi_R = \phi_c + \phi_m/2.$$

Assuming x=0 at core end 15, a magnet pole at position x, x=L at core end 17, and applying the above equation for F, $$F_L = \phi_L R_L = (\phi_c - \phi_m/2)(x/u/A),$$

and $$F_R = \phi_R R_R = (\phi_c + \phi_m/2)((L-x)/u/A),$$

where the L subscript refers to quantities to the left of the magnet position, the R subscript refers to quantities to the right, and reluctance, equal to length divided by permeability u, in Webers per Ampere-meter, divided by cross-sectional area A, in square meters, has been utilized. It is well known that for linear materials magnetic field energy is ½ the product of magnetomotive force F and magnetic flux $\phi$. Solving for total field energy $W_T$ Joules in the core, we obtain $$W_T = W_L + W_R = ((\phi_c - \phi_m/2)^2 x + (\phi_c + \phi_m/2)^2 (L-x))/2/u/A,$$

which reduces to $$W_T = -\phi_c \phi_m x/u/A + (\phi_c + \phi_m/2)^2 L/2/u/A.$$

Recalling that output force is the negative spatial rate of change of field energy, and taking the derivative, only the first term gives a non-zero value for force f, in Newtons, $$f = -d/dx(-\phi_c \phi_m x/u/A) = (\phi_c/u/A)\phi_m = H_c \phi_m,$$

where the quantity $\phi_c/u/A$ has been replaced with the well-known equivalent, magnetic intensity $H_c$, in Amperes per meter. In conclusion, output force f, in Newtons, for the embodiment of the present invention shown in FIG. 1, is the product of the magnetic intensity, in Amperes per meter, produced by the electromagnet coils, and appearing between surfaces 15 and 17 of ferromagnetic core 13, multiplied by the permanent magnet flux $\phi_m$, in Webers. The direction of the force may be reversed by reversing $H_c$, and as shown in FIG. 1, a north pole N will travel in the direction of the control flux $\phi_c$. Conversely, a south pole S of a magnet travels in the opposite direction. All embodiments of the present invention produce force in the same manner and satisfy the above equation. For rotary embodiments of the present invention, torque, in Newton-meters is equal to the product of the force, in Newtons times the operating radius, in meters.

Figure 2:
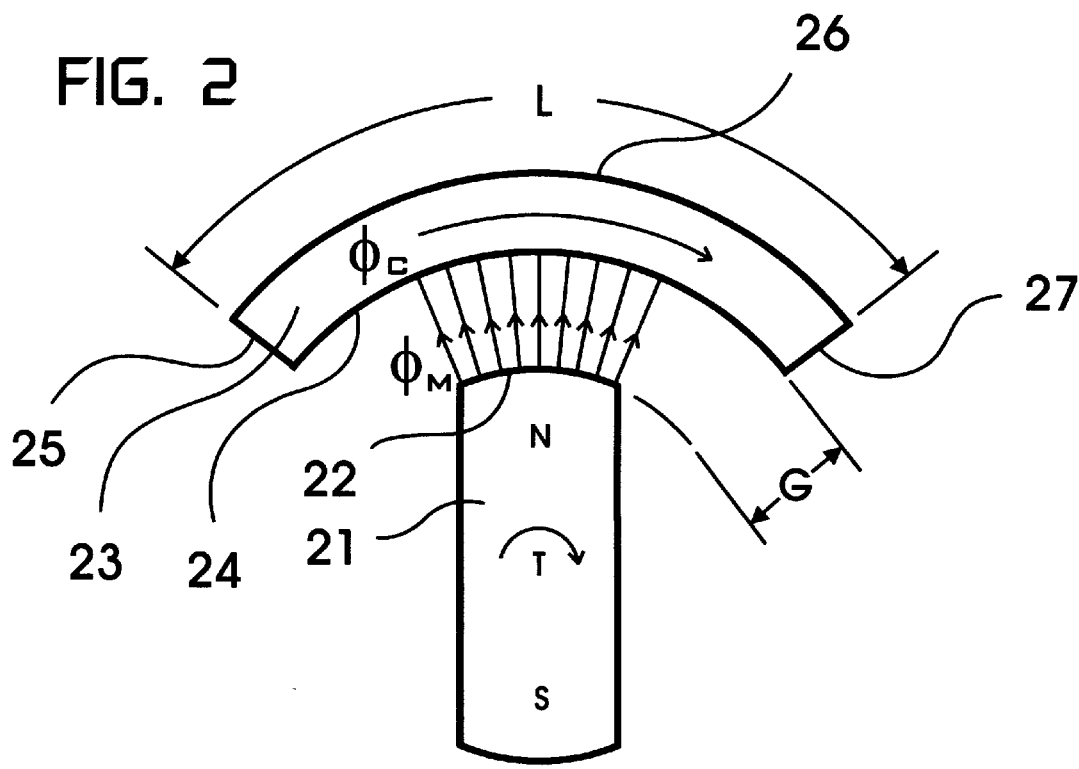
FIG. 2 is a drawing showing an annular magnetic core used with a permanent magnet for energy conversion in a rotary device of the present invention, wherein a magnet pole rotates in proximity to a surface located on an inside diameter.

FIG. 2 shows a rotary embodiment of the present invention having a first conversion element 23 consisting of a ferromagnetic annular core sector of geometric mean length L, having inside surface 24, top surface 26, and end surfaces 25 and 27 for receiving control-flux $\phi_c$. A second element is a permanent magnet or magnet assembly 21 having a north magnetic pole N and south magnetic pole S, having a cylindrical end-surface 22 which injects flux $\phi_m$ substantially orthogonally into the inside surface 24 of first element 23, and having rotation about a center as shown. The output torque, in Newton-meters, of this embodiment of the present invention is the product of force, from the above equation, and the geometric mean radius of the annular sector 23.

FIG. 3 shows a rotary embodiment of the present invention having a first conversion element 53 consisting of a ferromagnetic annular core sector of geometric mean length L, having bottom surface 54, top surface 56, and end surfaces 55 and 57 for receiving control-flux $\phi_c$. A second element is a permanent magnet or magnet assembly 51 having a north magnetic pole N and south magnetic pole S, having an annular-sector end-surface 52 which injects flux $\phi_m$ substantially orthogonally into the bottom surface 54 of first element 53, and having rotation about a center as shown. The output torque, in Newton-meters, of this embodiment of the present invention is the product of force, from the above equation, and the geometric mean radius of the annular sector 53.

Other embodiments of the present invention exist, wherein the center axis of the core conversion element does not lie either in a line, as in FIG. 1, or in a plane, as in FIG. 2 and FIG. 3. Two of these embodiments are shown in FIG. 4 and FIG. 5, and have the capability of an angular travel greater than 1 revolution.

Figure 4:
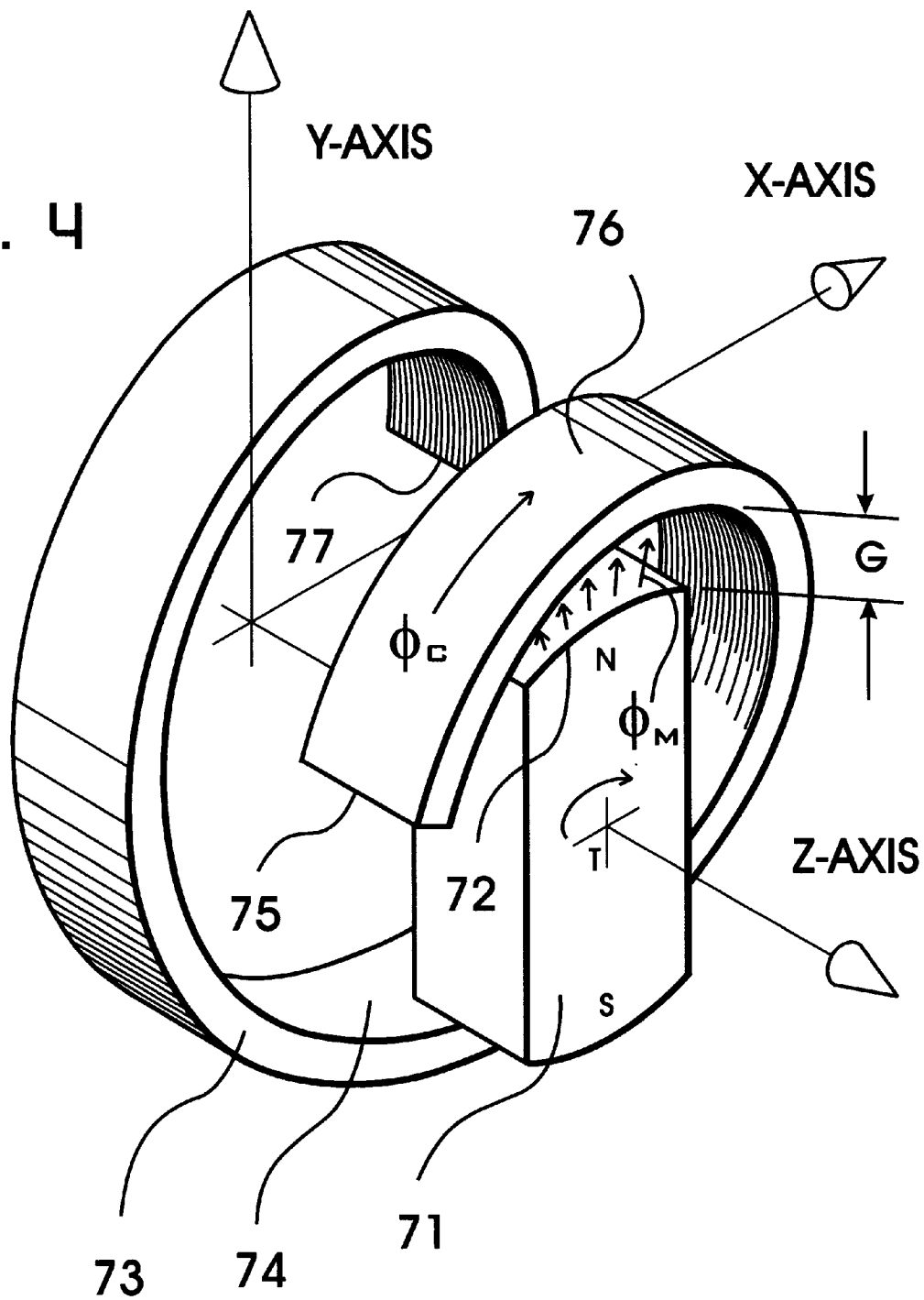
FIG. 4 is a drawing showing a helical magnetic core used with a permanent magnet for energy conversion in a rotary device of the present invention, wherein a magnet pole travels in proximity to a surface located on an inside diameter.

FIG. 4 is a rotary embodiment of the present invention and is a non-planar variation of that shown in FIG. 2, having a first conversion element 73 consisting of a ferromagnetic helical core with inside surface 74, outside surface 76, and end surfaces 75 and 77 for receiving control-flux $\phi_c$. A second element is a permanent magnet or magnet assembly 71 having a north magnetic pole N and south magnetic pole S, having a cylindrical end-surface 72 which injects flux $\phi_m$ substantially orthogonally into the inside surface 74 of first element 73, and having motion constrained to a helical internal path adjacent to inside surface 74. The output torque, in Newton-meters, of this embodiment of the present invention is the product of force, from the above equation, and the geometric mean radius of the helical core 73.

Figure 5:
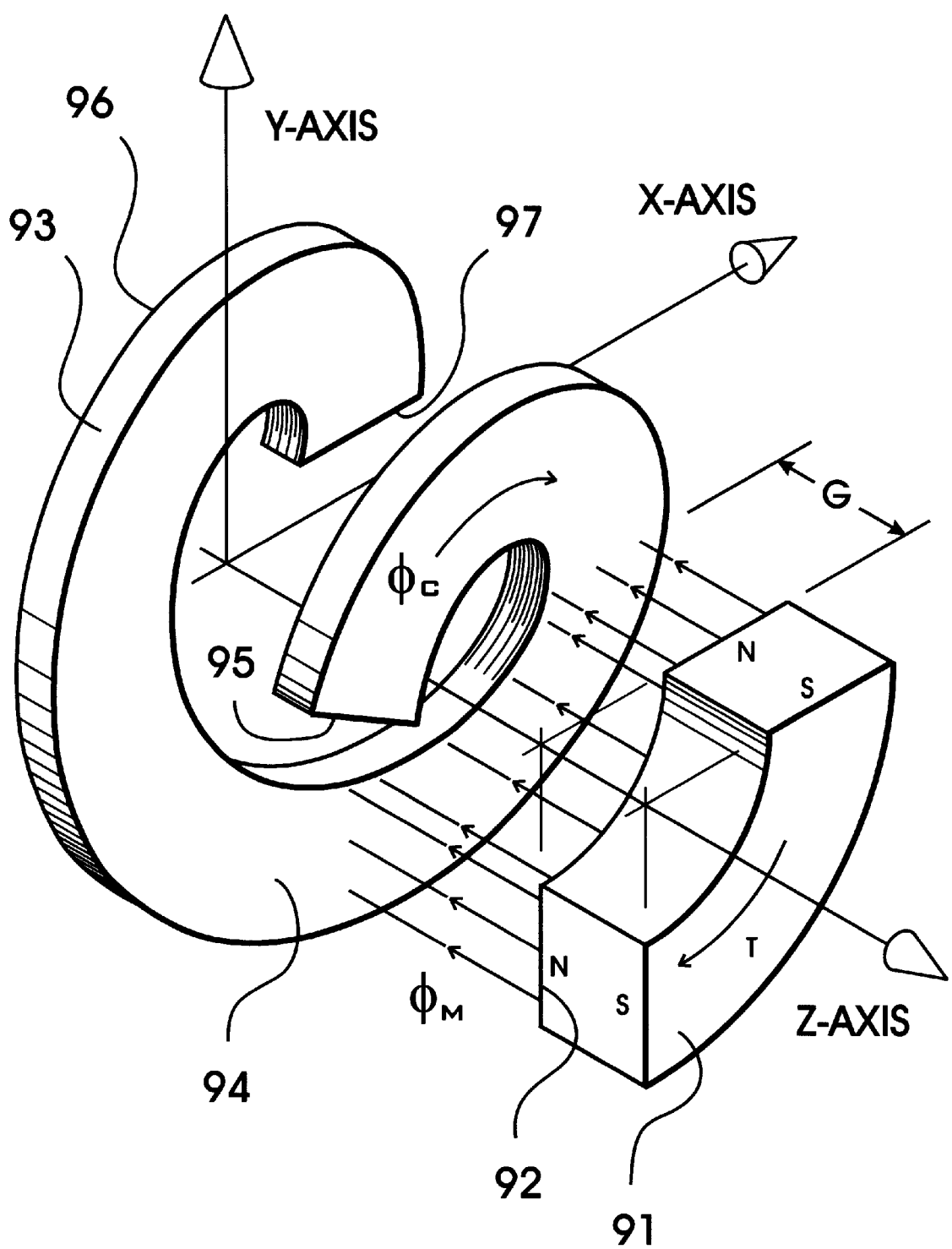
FIG. 5 is a drawing showing a helical magnetic core used with a permanent magnet for energy conversion in a rotary device of the present invention, wherein a magnet pole travels in proximity to a lateral intercoil surface.

FIG. 5 is a rotary embodiment of the present invention and is a non-planar variation of that shown in FIG. 3, having a first conversion element 93 consisting of a ferromagnetic helical core with first lateral surface 94, opposite lateral surface 96, and end surfaces 95 and 97 for receiving control-flux $\phi_c$. A second element is a permanent magnet or magnet assembly 91 having a north magnetic pole N and south magnetic pole S, having an annular-sector end-surface 92 which injects flux $\phi_m$ substantially orthogonally into the lateral surface 94 of first element 93, and having motion constrained to a helical path adjacent to lateral surface 94. The output torque, in Newton-meters, of this embodiment of the present invention is the product of force, from the above equation, and the geometric mean radius of the helical core 93.

Figure 6:
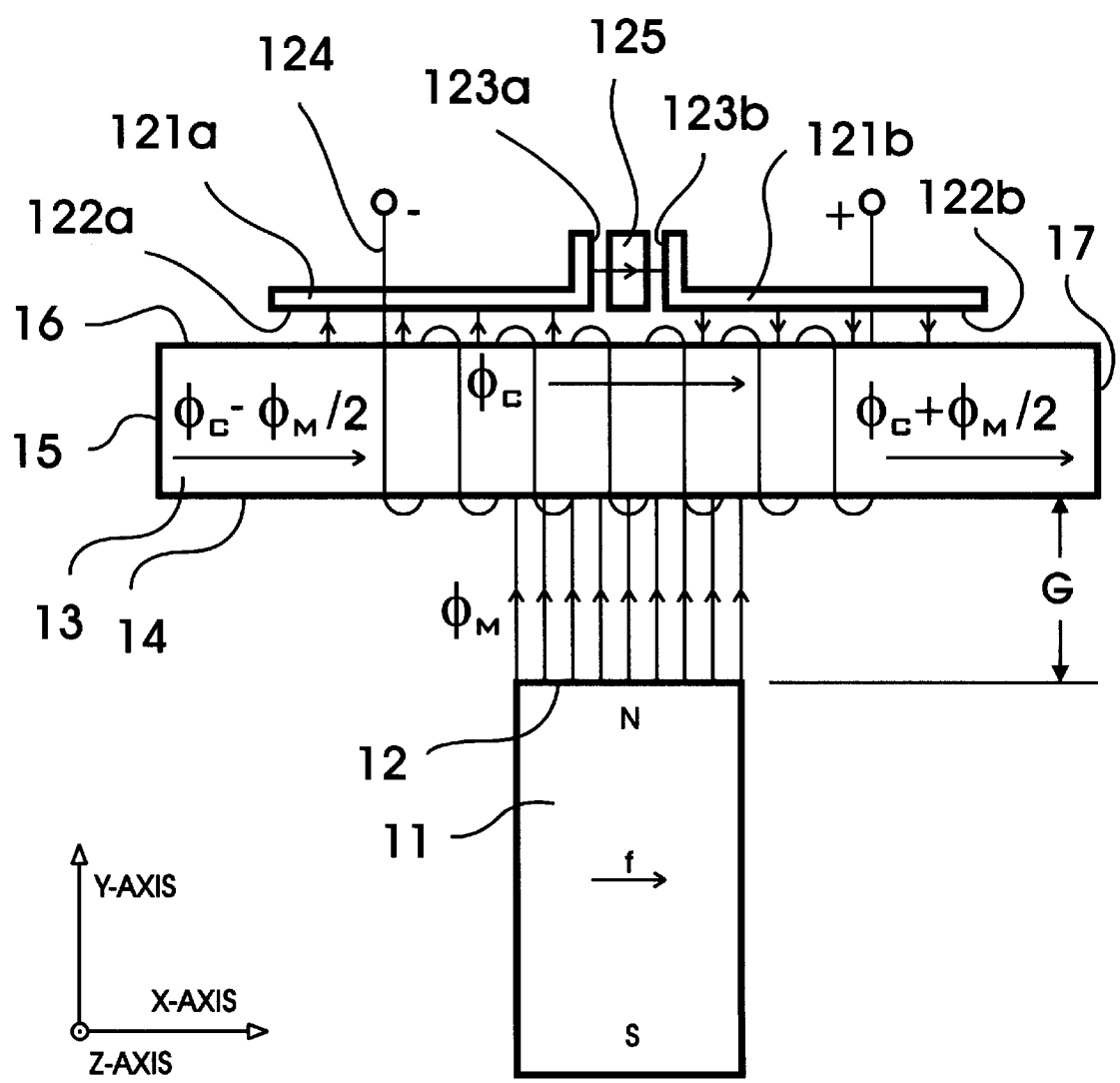
FIG. 6 is a drawing showing velocity and displacement means implemented in the present invention.

All of the actuator embodiments of the present invention have ferromagnetic core elements which are unencumbered, allowing space for innumerable types of sensing and control elements. Also, since mechanical output is a direct function of the energy-conversion core geometry and magnetic material composition, the nature and form of the output is easily customized. FIG. 6 shows one method for position sensing, and one method for velocity sensing, as they would be installed on the embodiment of FIG. 1.

The position sensing means consists of ferromagnetic elements 121a and 121b for collecting magnetic flux respectively from a substantial left portion and a substantial right portion of ferromagnetic core 13. Magnetic flux is first collected from core 13 by surfaces 122a and 122b, and then directed to a substantially shorter gap defined by surfaces 123a and 123b, which has a linear-type Hall sensing element 125 included between. The portion of magnetic flux collected from the ferromagnetic energy-conversion core 13 may be defined as a leakage flux, and a constant K, substantially less than 1, can be defined such that leakage flux equals the product of K and the core flux. When magnet 11 is at the left extremity, core flux=$(\phi_c+\phi_m/2)$, and leakage flux=$K(\phi_c+\phi_m/2)$.

When the magnet 11 is at the right extremity, core flux=$(\phi_c-\phi_m/2)$, and leakage flux=$K(\phi_c-\phi_m/2)$.

The change in flux through Hall sensing element 125 is the difference in leakage fluxes, leakage flux change=$K(\phi_c+\phi_m/2)-K(\phi_c-\phi_m/2)=K(\phi_m/2+\phi_m/2)=K\phi_m$.

Thus, as magnet 11 moves from right to left, leakage flux increases proportionally, and the output of linear Hall sensing element 125 contains a Voltage component proportional to position.

In the present invention, a velocity-sensing means employing a single coil 124 may be utilized. As above, when magnet 11 is at the left extremity, core flux=$(\phi_c+\phi_m/2)$, and when the magnet 11 is at the right extremity, core flux=$(\phi_c-\phi_m/2)$, and the change in flux is $\phi_m$, assuming $\phi_c$ remains unchanged.

Defining a distance D, in meters, over which flux changes, the output of coil 124 may be calculated. By Faraday's law of induction, $E_{avg}=Nd/dt(\phi)=N\phi_m/t$, where $E_{avg}$ is the average coil output, in Volts, N is coil turns, and $\phi_m$ is the flux change, in Webers, during the time t, in seconds. However, $t=D/V$, where V is average velocity in meters per second. Substituting into the above equation gives the result:

$E_{avg}=N\phi_m/t=(N\phi_m/D)V$, which states that the output Voltage of coil 124 is an analog of armature velocity with a multiplying constant equal to the product of coil turns N and flux change per unit distance $\phi_m/D$.

Figure 7:
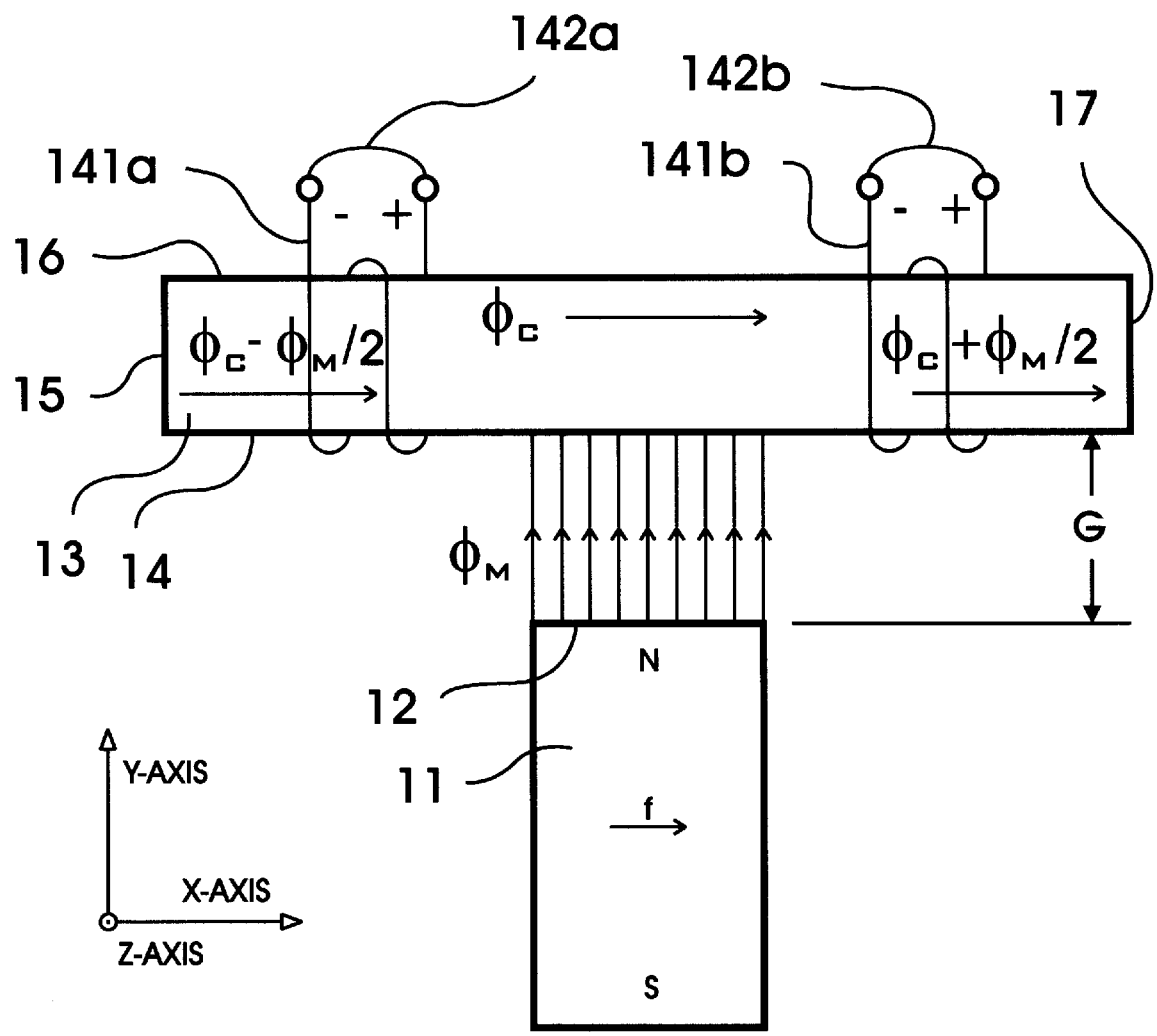
FIG. 7 is a drawing showing damping and braking means implemented in the present invention.

FIG. 7 shows 2 of many motion-control methods which can be used in the present invention.

In FIG. 7, coils 141a and 141b are placed at locations where damping forces are desired damping force may calculated using the familiar force equation, $f_d=ILB$, where $f_d$ is the force, in Newtons, I is the current in the coil, in Amperes, and L is the length of the coil, in meters, in a magnetic field density of B Webers per square meter. If R is the resistance, in Ohms, of a coil such as 141a and termination 142a, then by Ohm's Law $I=E/R$, and $f_d=(LB/R)E$.

But the Voltage E generated is related to velocity as in the above equation, and substitution gives the following result:

$f_d=(LB/R)E=(LB/R)(N\phi/x)V$, which defines a classical damping force, that is, a force proportional to velocity. Note that the term $\phi_m/D$ has been generalized to $\phi/x$, where $\phi$ is flux, in Webers, and x is the x-coordinate, in meters, along the armature direction of travel.

Figure 8:
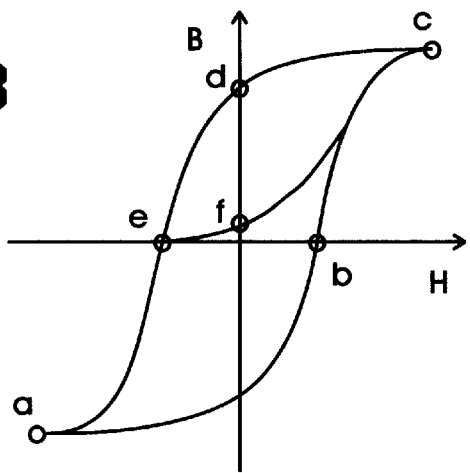
FIG. 8 is a graph of magnetic flux density B plotted versus magnetic intensity H, used in conjunction with FIG. 7, to explain hysteresis braking in the present invention.

Using FIG. 7 and associated FIG. 8, a second motion-control method may be defined for use in the present invention. This is known as hysteresis braking, and may be used to not only brake or stop motion, but also to hold or maintain the current position of the armature when control flux is turned off at core ends 15 and 17. First, considering the case where control flux $\phi_c$ equals zero, the material of core 13 will experience a B-H change along path a-e-d-c as magnet 11 travels from the right extremity to the left extremity. In this graph of FIG. 8, B is flux density, in Webers per square meter, and H is magnetic intensity in Amperes per meter. It is well known that the B-H product represents energy per unit volume of material, or Joules per cubic meter, and is the result of integrating to find the area of closed curve, such as a-e-d-c-b-a, on a B-H plot, such as FIG. 8. If the magnet now travels from the left extremity back to the right extremity, B and H will follow path c-b-a, and the area a-e-d-c-b-a, of the closed path will represent the total energy, per unit volume, expended during the cycle. Mathematically, it can be stated $W/(LA)$=Area a-e-d-c-b-a, where W is the energy, in Joules, L is the length of the core 13, in meters, A is the cross-section of core 13, in square meters and (LA) is therefore the volume of core 13. W is equal to total work expended on the armature:

$W=(LA)$Area $a$-$e$-$d$-$c$-$b$-$a=2Lf_h$, where $f_h$ is force, in Newtons, on the armature and 2L is total armature travel, in meters. Solving for $f_h$, $f_h=(A/2)$Area $a$-$e$-$d$-$c$-$b$-$a$.

This final result shows that the hysteresis braking force H is proportional to the enclosed area of the B-H loop a-e-d-c-b-a.

A second example of hysteresis braking in the present invention illustrates that braking force is substantially reduced for high control flux input. For B-H loop e-d-c-f-e, control flux is of such magnitude that total flux in core 13 does not reverse, and a minor hysteresis loop e-d-c-f-e is traversed. From the above equation, hysteresis braking force is $f_h=(A/2)$Area $e$-$d$-$c$-$f$-$e$, Which is substantially reduced from the zero-control-flux case.

Hysteresis braking in the present invention has been shown to be a function of the magnetic B-H loop of the material used in the ferromagnetic energy-conversion core. Commercially, a large variety of materials are available, and essentially any desired level of braking may be realized.

Figure 9:
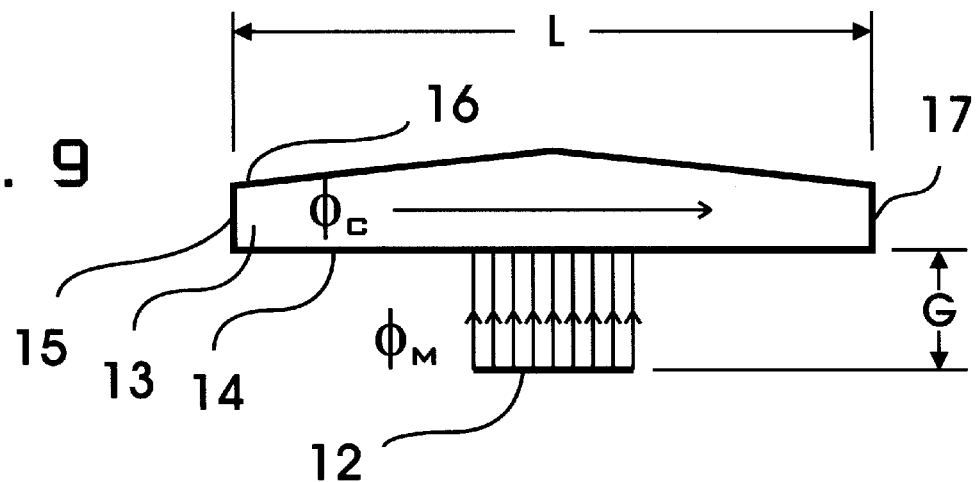
FIG. 9 is a drawing showing how a variation in the working core cross-section can be implemented, without magnet gap variation, in the present invention.
Figure 10:
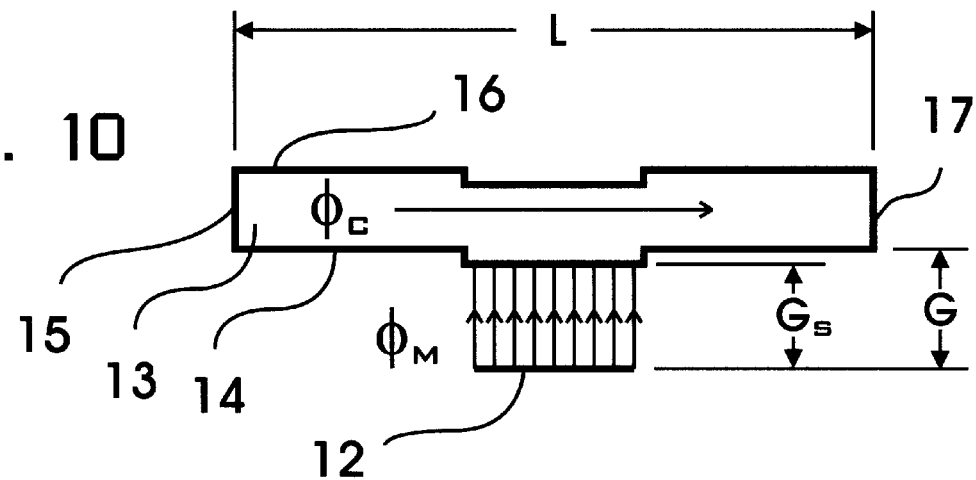
FIG. 10 is a drawing showing how a variation in the magnet gap can be implemented, without varying working core cross-section, in the present invention.
Figure 11:
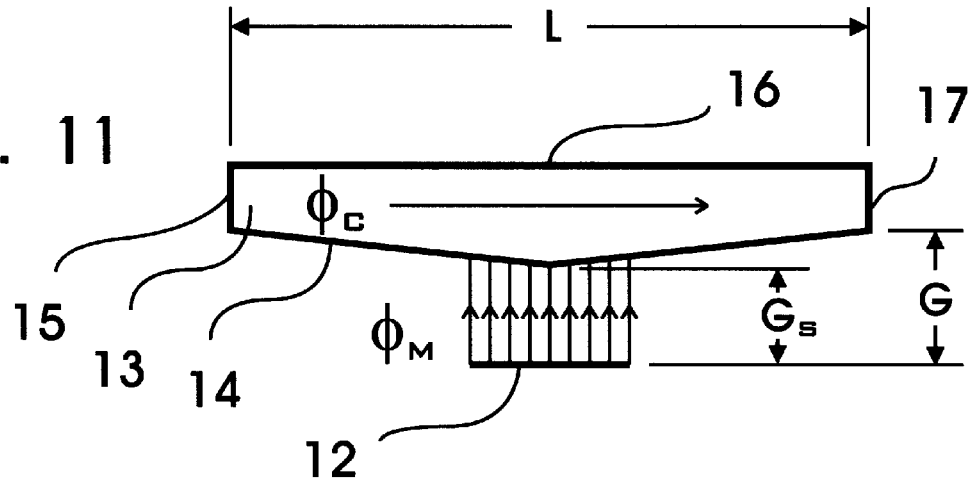
FIG. 11 is drawing showing a method of implementing simultaneous variations in core cross-section and magnet gap, in the present invention.

FIG. 9, FIG. 10 and FIG. 11 are drawings of the present invention wherein varying area of core 13 and varying magnet gap G are used to customize the value of force output at various armature positions. In first FIG. 9, cross-sectional area A, in square meters increases linearly toward the center of core 13, gap G between magnet surface 12 and core surface 14 being constant.

From earlier derivation, $$f=H_c\phi_m,$$

where f is force, in Newtons, Hc is magnetic intensity, in Amperes per meter, and $\phi_m$ is magnetic flux in Webers. But, $$H_c=d/dx(F_c)=d/dx(\phi_c R)=d/dx(\phi_c x/uA)=(\phi_c/u)\,A, \text{ and } f=H_c\phi_m=(\phi_m\phi_c/u)/A,$$

where $F_c$ is magneto-motive-force, in Amperes, developed along the length L of core 13, $\phi_c$ is control flux, in Webers, R is core reluctance, in Amperes per Weber, at location x, in meters, u is permeability, in Webers per Ampere-meter and A is core cross-sectional area, in square meters, at location x. Referring to FIG. 9, this equation predicts higher forces when magnet surface 12 is at ends 15 and 17 of core 13, and a lower force at the center position, the ratio of the two forces being equal to the inverse ratio of the cross-sectional areas, that is, force is inversely proportional to area.

FIG. 10 illustrates a change in magnet gap G, in meters, with no change in cross-sectional area. Again applying the equation $$f=H_c\phi_m,$$

and substituting for $\phi_m$, $$f=H_cF_m/R_m=(H_c\,F_m uA_m)/G_m,$$

where $F_m$ is the magnet magnetomotive force, in Amperes, $R_m$ is the total reluctance, in Amperes per Weber, of the magnetic circuit traversed by $\phi_m$, $A_m$ is the cross-sectional area, in square meters, of the magnet and $G_m$ is the total effective gap length of the magnetic circuit. This equation predicts an increase in force when the magnetic surface 12 is under the influence of the shorter center gap $G_s$.

FIG. 11 illustrates varying both magnet gap G and cross-sectional area in the present invention, and the results may be predicted by adding results of the two equations derived above.

Figure 12:
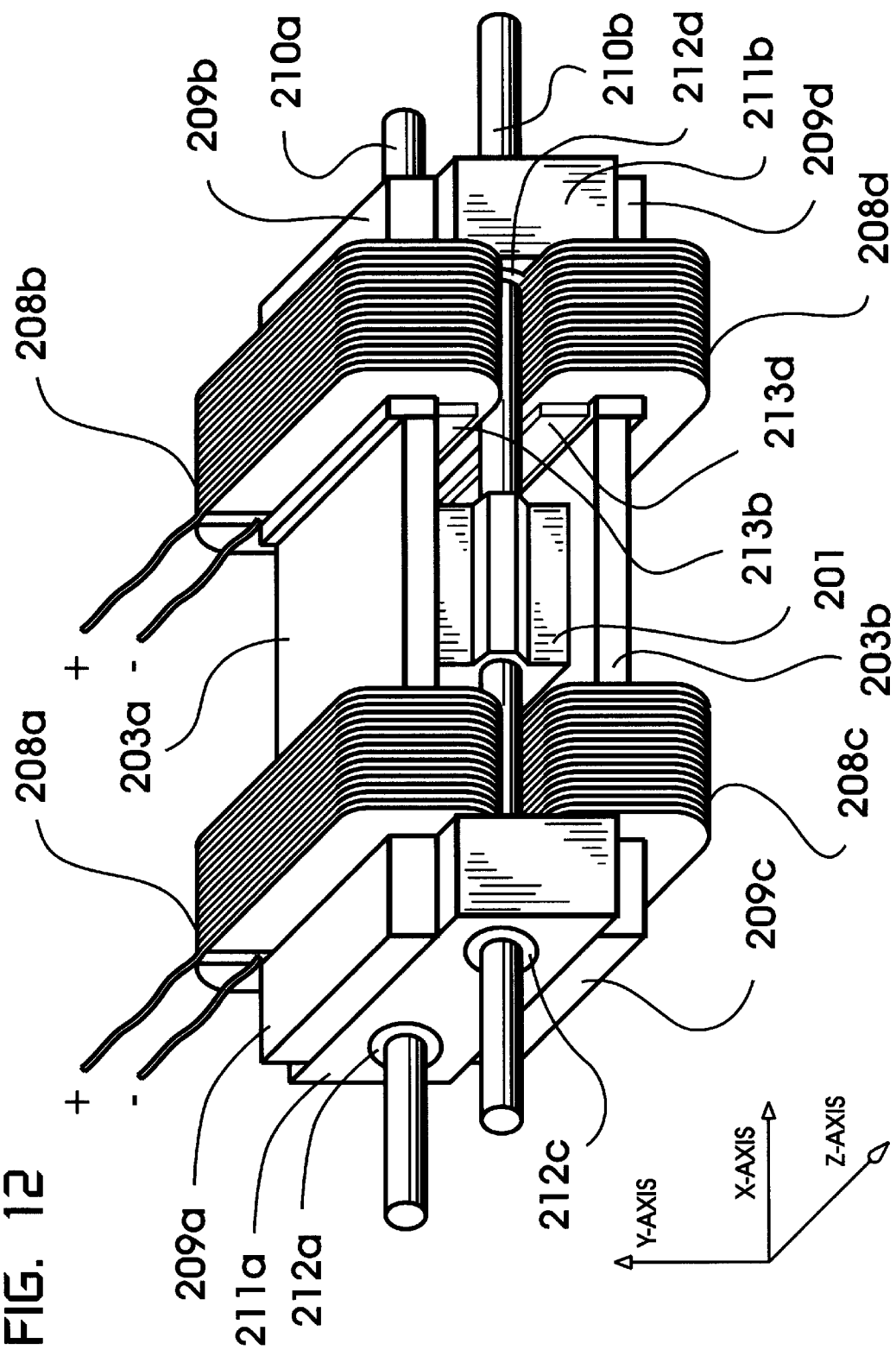
FIG. 12 is a perspective drawing of a 2-pole linear model, constructed in accordance with design rules of the present invention.
Figure 13:
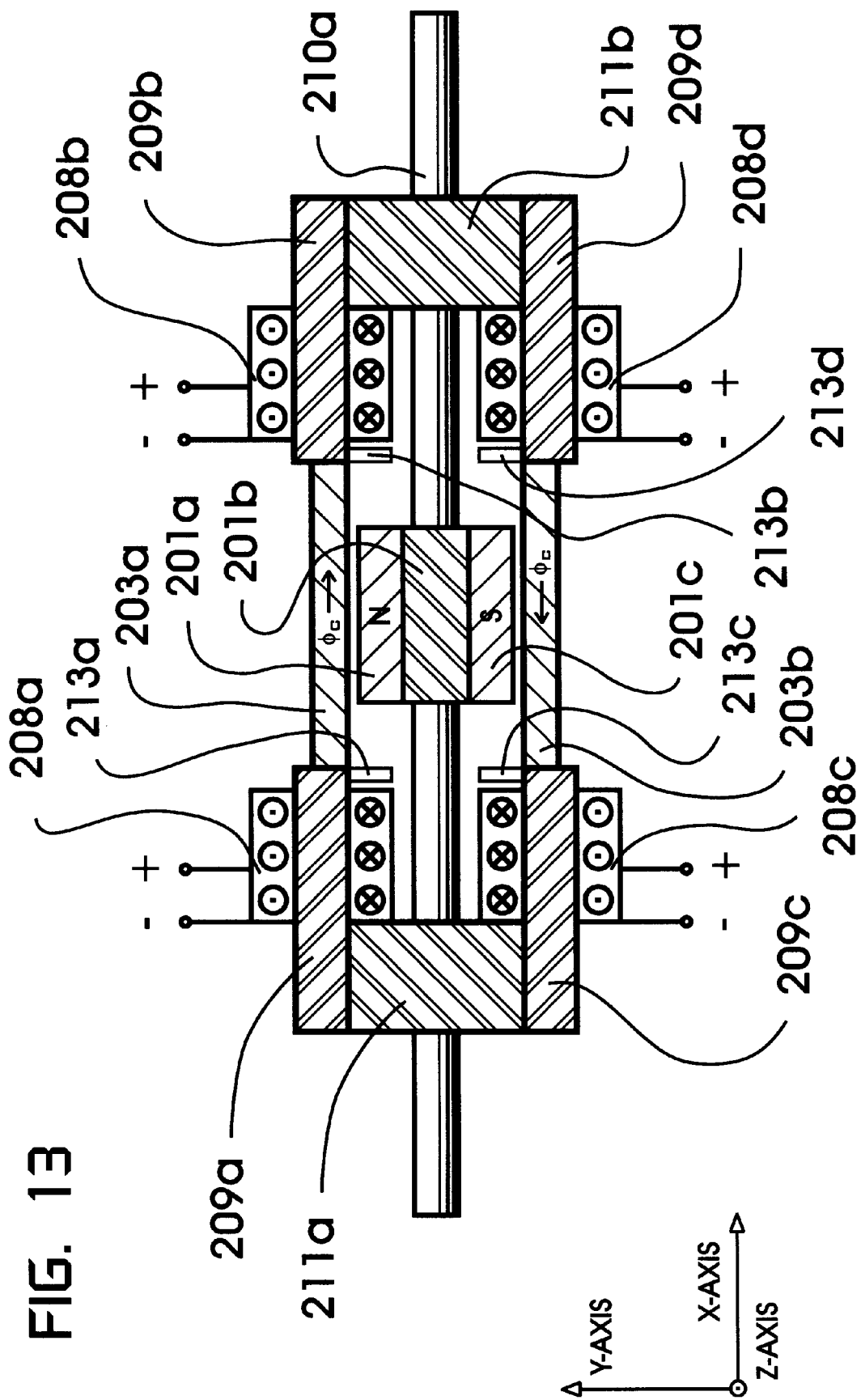
FIG. 13 is a front elevational cross-section taken along a central vertical plane of the linear model of FIG. 12, showing more details such as magnetic flux paths and mechanical stops.

FIG. 12 is a perspective drawing of a preferred embodiment of a linear actuator constructed according to the present invention. FIG. 13 is a front elevational cross-section taken along a central vertical plane of the embodiment of FIG. 12, and more clearly shows operational details.

Ferromagnetic energy-conversion cores 203a and 203b are located respectively above the N pole and below the S pole of a movable armature assembly 201, which consists of conventional flat rectangular magnets 201a and 201c, bonded with epoxy or other suitable structural adhesive to a center member 201b of a highly permeable magnetic material, such as low-carbon steel. This movable armature assembly is forced to travel along a path parallel to cores 203a and 203b by dual shafts 210a and 210b, being journaled by suitable sleeve or ball bearings such as 212a, 212c and 212d. End blocks 211a and 211b of highly permeable magnetic material, such as low-carbon steel, provide mechanical support, define the working clearances of the magnet assembly, hold bearings 212a, 212c and 212d and provide flux paths for both the permanent magnet assembly 201, and the electromagnet assemblies 209a, 209b, 209c and 209d, having respective coils 208a, 208b, 208c and 208d. Mechanical stops 213a, 213b, 213c and 213d, which may be either fixed or adjustable, are constructed of a tough, mechanically-compliant material and are capable of absorbing armature energy at the end of travel.

Function of the linear embodiment of the present invention is best described using the elevational view of FIG. 13. All embodiments of the present invention consist of one or more elements in which a control flux $\phi_c$ flows, being generated by one or more electromagnets having a coil and a ferromagnetic core of low reluctance, compared to the conversion element. Further, in all embodiments of the present invention, each conversion element has an adjacent pole of a permanent magnet which injects a magnetic flux $\phi_m$ which interacts with $\phi_c$ to produce a force upon a movable armature member, usually, but not necessarily, mechanically associated with the permanent magnet. The force has been shown to be $$f=H_c\phi_m,$$

where f is force, in Newtons, $H_c$ is magnetic intensity, in Amperes per meter, developed by $\phi_c$ at the permanent magnet location and $\phi_m$ is the magnetic flux, in Webers, injected into the energy-conversion member by the magnet.

Referring to FIG. 13, a first, control magnetic circuit is seen to be a closed magnetic circuit, having substantially no air gaps, and consisting of control core 209a, conversion core 203a, control core 209b, end block 211b, control core 209d, conversion core 203b, control core 209c and end block 211a, completing the circuit. All members except 203a and 203b are designed to supply magnetic flux and are of a ferromagnetic material having a substantially greater flux carrying capability than that of energy conversion cores 203a and 203b, resulting in highest magnetic intensity $H_c$ being localized in the conversion region. Variable magnetic field energy is produced in the control magnet circuit by means of four coils 208a, 208b, 208c and 208d. Although, in such a closed magnetic circuit, one coil can produce control flux, four coils can operate more efficiently and also reduce effects of flux leakage into the surrounding medium. It should be noted that the closed nature of the control magnetic circuit is characteristic of the present invention and results in high conversion efficiency.

Again referring to FIG. 13, a second, substantially orthogonal magnetic circuit consists of magnet assembly 201a, 201b, and 201c, and the closed first magnetic circuit loop defined above. Magnet flux $\phi_m$ leaves pole N and travels both directions, to the left and to the right, around the first, closed magnetic path, then returns to pole S. It should be noted that only substantially small gaps are required for this second magnetic circuit, and it is also essentially a closed magnetic circuit, again resulting in high conversion efficiency for the present invention.

In FIG. 13, current in coils 208a–208d is shown coming out by a dot and going inward by an X. For currents as shown, the right-hand rule results in control flux $\phi_c$ to the right in top core 203a and to the left in bottom core 203b. Characteristic of the present invention, a N magnetic pole will experience a force in the direction of the control flux $\phi_c$ and a S magnetic pole will experience a force opposite to the direction of control flux $\phi_c$. Thus, both the N and S poles in FIG. 13 cooperate to produce a force directed to the right. Reversing coil current reverses $\phi_c$ and output force.

The use of dual opposing poles, as in FIG. 13, results in the tractive force between the N pole and core 203a being cancelled by the tractive force between the S pole and core 203b. This is desirable to reduce bearing friction and loss of mechanical output in the present invention.

In FIG. 13, mechanical stops 213a–213d are employed to restrict armature travel and absorb energy. These can be either fixed or adjustable, and are preferably constructed of a material which is compliant, tough and energy-absorbing. Since this combination of properties is hard to obtain in a single material, the stops may be a sandwich containing a tough material, such as stainless steel, for the impact surface, behind which a compliant, energy-absorbing material, such as energy-absorbing rubber, is placed. Finally, the last or substrate material should be rigid and stable, so that the stop position is maintained during operational life.

In the above, the present invention has been shown to consist of two magnetic circuits which interact within a common ferromagnetic core or region to convert electrical energy to mechanical energy. Unlike this functional description, the discussion below separates the present invention into a control-flux assembly and an energy-conversion section, in order to show some of the many possible geometric forms.

FIG. 14–FIG. 27 are drawings showing a variety of control-flux assemblies which can interface to the energy-conversion section of FIG. 12, that is, magnet assembly 201 and cores 203a and 203b.

Figure 14:
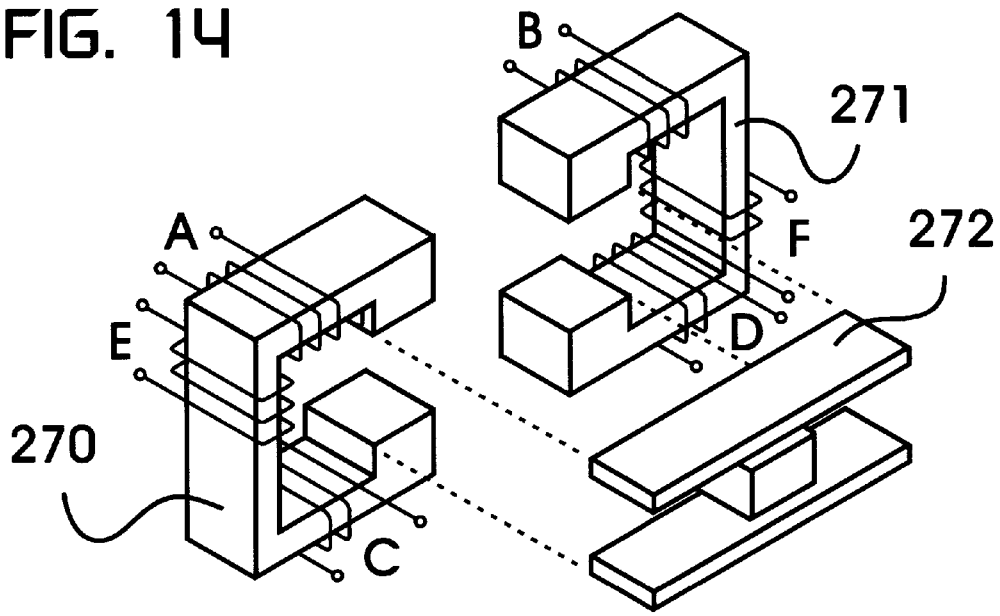
FIG. 14 is a drawing of a linear device constructed according to the present invention, having dual active control-flux sources, coplanar, and located at the left and right ends of the assembly.

In FIG. 14, the energy conversion portion 272 of the present invention is placed in an exploded view to emphasize the flux-control portion. In subsequent drawings, through FIG. 27, the conversion portion 272 is shown, in position, by dotted lines.

In FIG. 14–FIG. 19, coplanar versions are depicted. Beginning with FIG. 14, a generally U-shaped ferromagnetic core 270 at the left end, may contain windings at locations A, C or E. A similar core 271 at the right end, may also have windings at locations B, D or F. In this embodiment both end assemblies are capable of supplying magnetic energy and may be called active, or energy-generating, devices.

Figure 15:
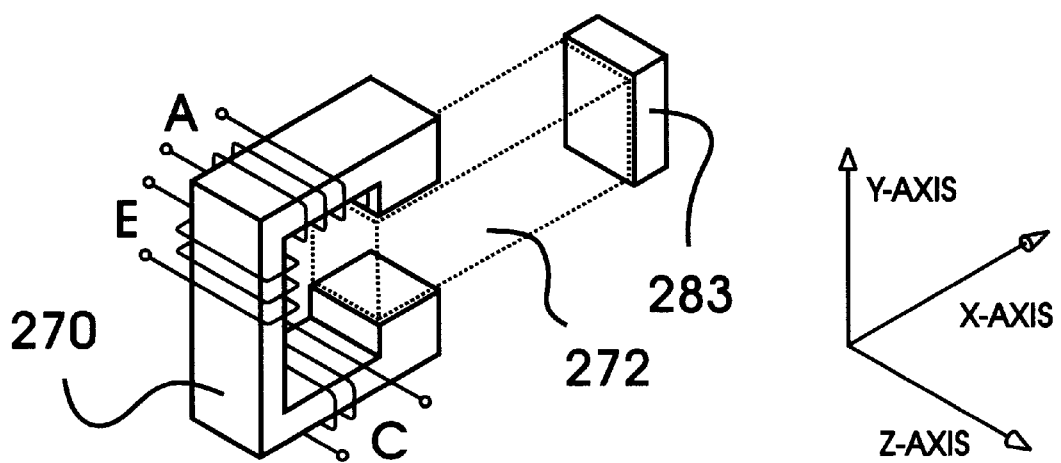
FIG. 15 is a drawing of a linear device constructed according to the present invention, having 1 active control-flux source and 1 passive flux-conducting end-path, coplanar, and located at the left and right ends of the assembly.
Figure 16:
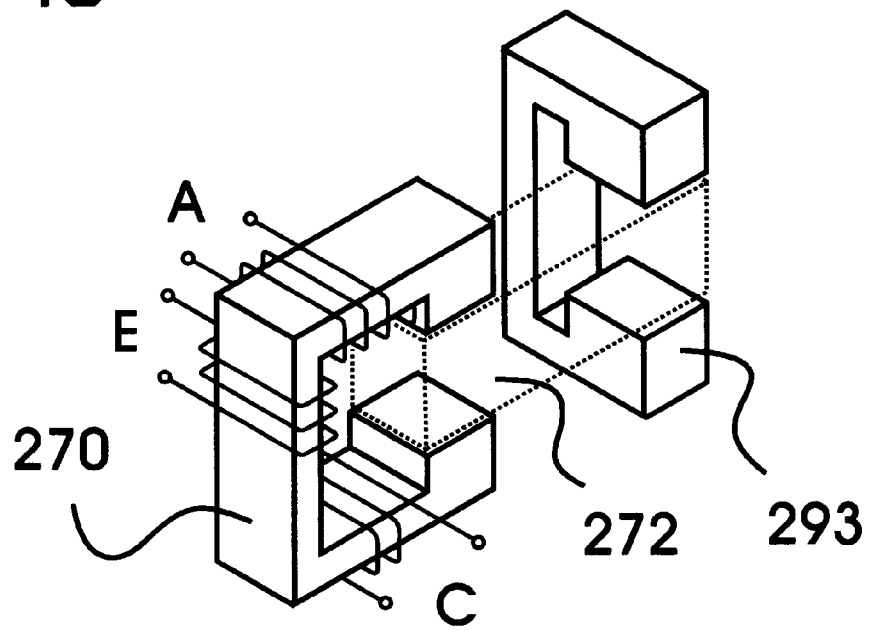
FIG. 16 is a drawing of a linear device constructed according to the present invention, having 1 active control-flux source and 1 passive flux-conducting side-path, coplanar, and located at the left and right ends of the assembly.

FIG. 15 is a drawing of a coplanar embodiment with an active left end as in FIG. 14, but has a passive, or energy-dissipating, end 283, in the form of a simple rectangular plate, for returning flux at the right end.

In the embodiment of FIG. 15, as the armature magnet, 201 of FIG. 12, travels to the right, it will be attracted to end-plate 283. The embodiment of FIG. 16 averts this potential problem by using a generally U-shaped end 293 which uses exterior surfaces of conversion section 272 to return flux, thereby leaving the travel of magnet 201 unimpeded.

Figure 17:
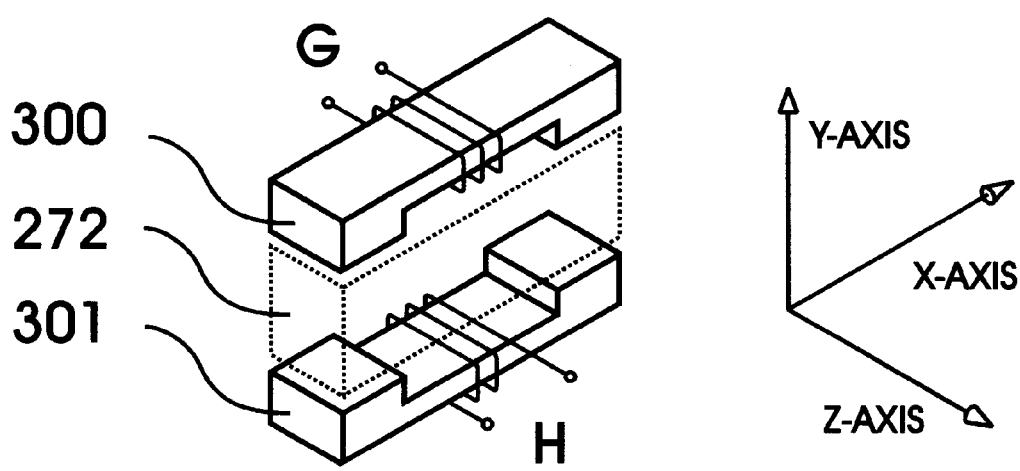
FIG. 17 is a drawing of a linear device constructed according to the present invention, having dual active control-flux sources, coplanar, and located at the top and bottom of the assembly.

FIG. 17 is a drawing of a coplanar embodiment having control-flux assemblies located at the top and bottom of energy conversion section 272. The top control-flux assembly consists of a core 300 having a straight section, which defines a coil location G, and having salient poles at the left and right ends to carry magnetic flux into the top of the energy-conversion section 272. Similarly, a bottom control-flux assembly has a core 301 and defined coil location H for producing flux in the bottom of energy-conversion section 272.

Figure 18:
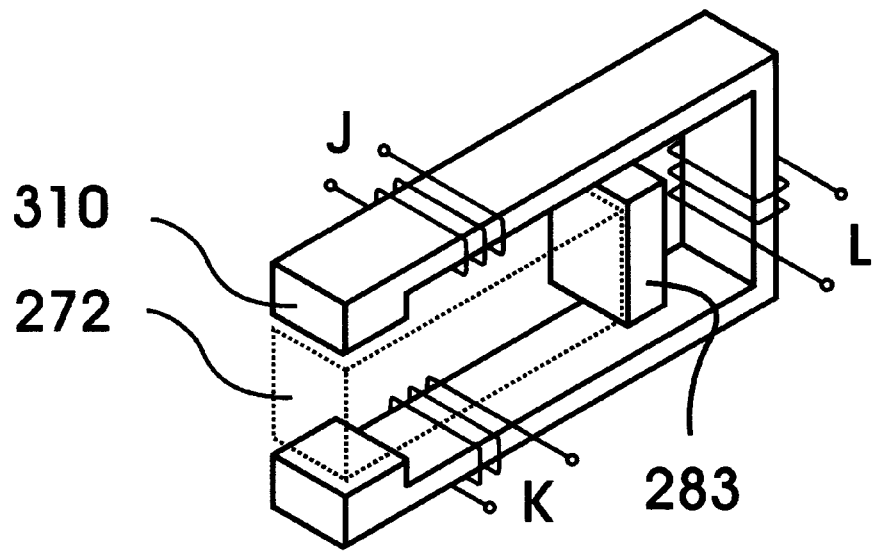
FIG. 18 is a drawing of a linear device constructed according to the present invention, having 1 active control-flux source and 1 passive flux-conducting end-path, coplanar, wherein the control flux source surrounds the energy-converting elements and the end-path.

FIG. 18 is a coplanar embodiment of the present invention with some similarity to FIG. 15. However, the generally U-shaped core 310, having potential coil locations J, K or L, has been rotated 180 Degrees, thus reducing the overall length of the assembly. Passive end 283 provides a return path for magnetic flux.

Figure 19:
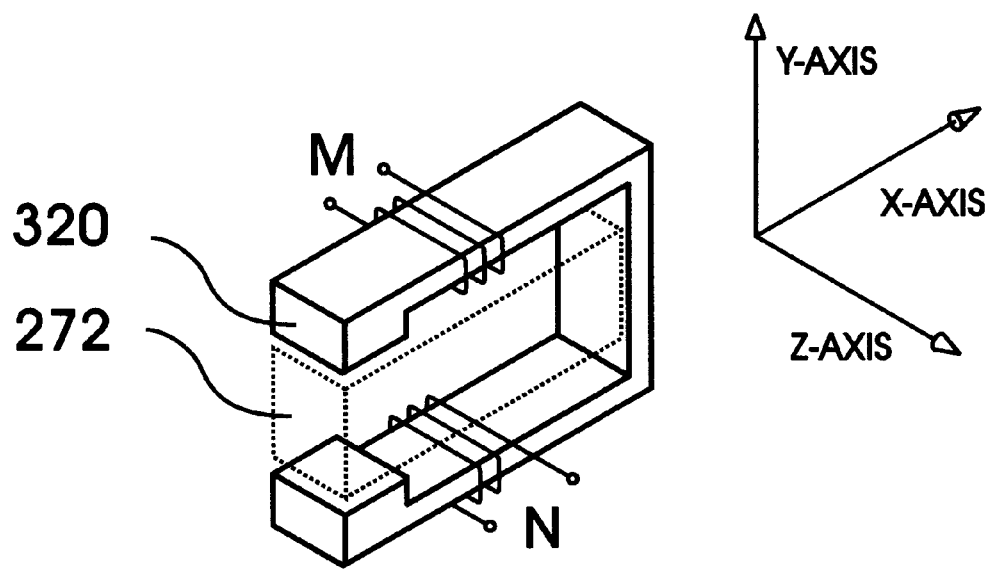
FIG. 19 is a drawing of a linear device constructed according to the present invention, having 1 active control-flux source, coplanar, wherein the control-flux source surrounds the energy-converting elements and has a core portion utilized as a passive end-path.

FIG. 19 is a coplanar embodiment similar to FIG. 18. However, Generally U-shaped member 320, having coil locations M and N, not only provides control flux, but replaces return path 283 and provides a path for magnet flux $\phi_m$. This results in an assembly even shorter in length.

FIG. 20–FIG. 23 depict embodiments of the present invention having control-flux assemblies located in a plane generally perpendicular to the plane of the energy-conversion section.

Figure 20:
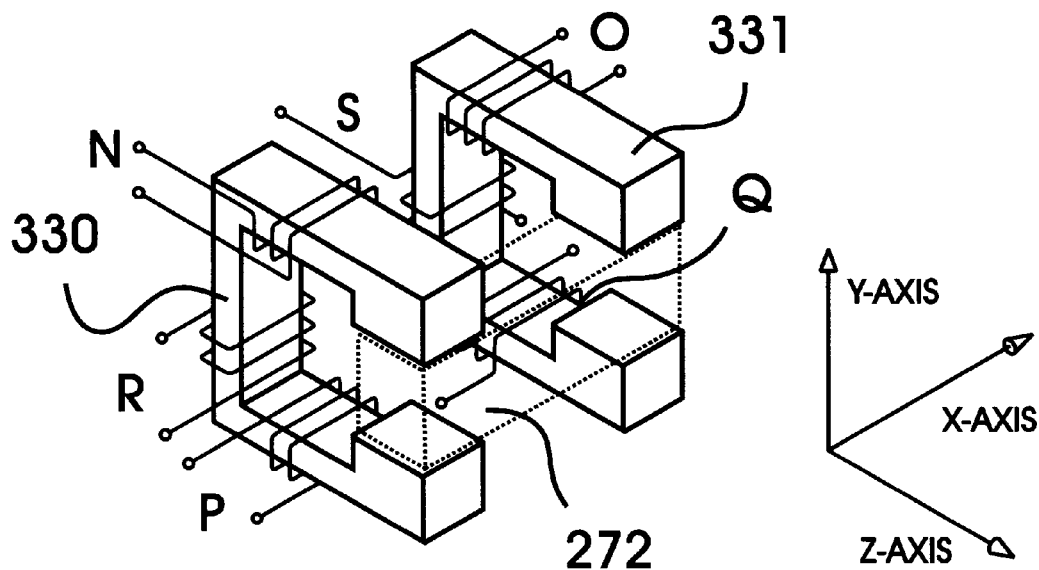
FIG. 20 is a drawing of a linear device constructed according to the present invention, having dual active control-flux sources, perpendicular to the axis of conversion, and located at the left and right ends of the assembly.

FIG. 20 is a drawing of an embodiment similar to FIG. 14, with the control-flux assemblies rotated 90 degrees. A generally U-shaped ferromagnetic core 330 at the left end, may contain windings at locations N, P or R. A similar core 331 at the right end, may also have windings at locations O, Q or S. In this embodiment both end assemblies are capable of supplying magnetic energy and may be called active, or energy-generating, devices. Length is considerably shortened by locating the flux-control assemblies in a perpendicular plane.

Figure 21:
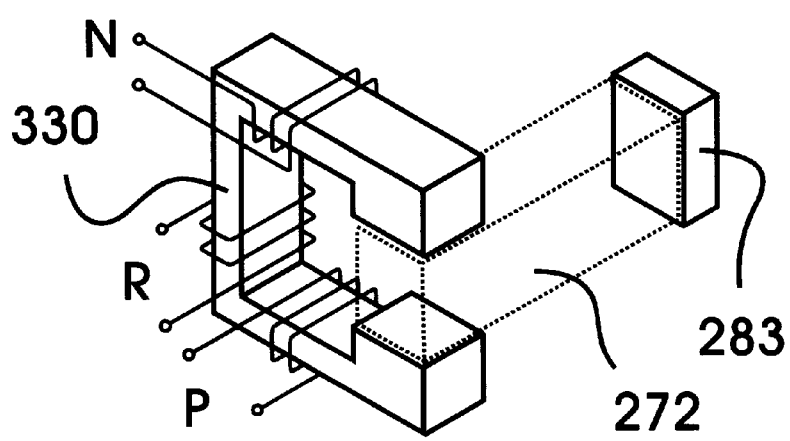
FIG. 21 is a drawing of a linear device constructed according to the present invention, having 1 active control-flux source, perpendicular to the axis of conversion, and having a passive flux-conducting end-path.
Figure 22:
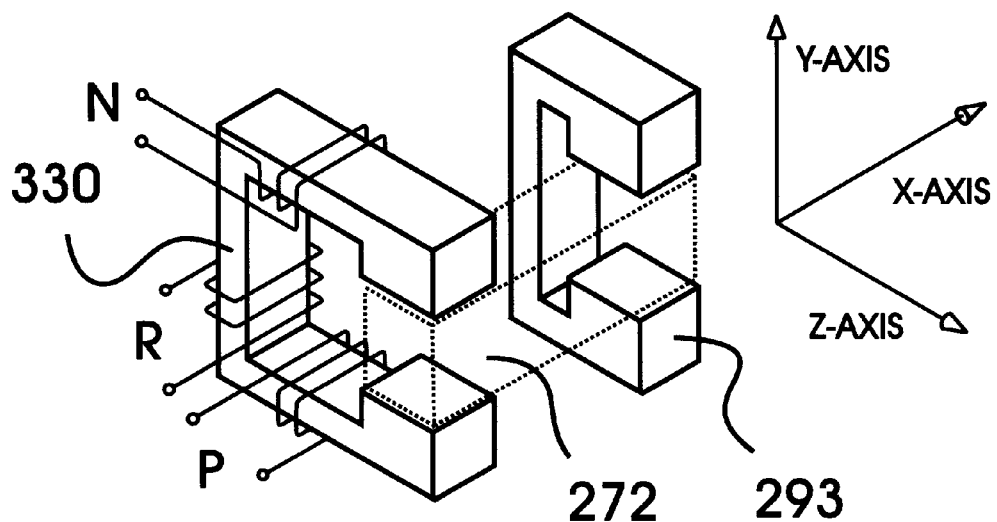
FIG. 22 is a drawing of a linear device constructed according to the present invention, having 1 active control-flux source, perpendicular to the axis of conversion, and having a passive flux-conducting side-path.

FIG. 21 is a drawing of a perpendicular embodiment with an active left end as in FIG. 20, but has a passive, or energy-dissipating, end 283, in the form of a simple rectangular plate, for returning flux at the right end.

In the embodiment of FIG. 21, as the armature magnet, 201 of FIG. 12, travels to the right, it will be attracted to end-plate 283. The embodiment of FIG. 22 averts this potential problem by using a generally U-shaped end 293 which uses exterior surfaces of conversion section 272 to return flux, thereby leaving the travel of magnet 201 unimpeded.

Figure 23:
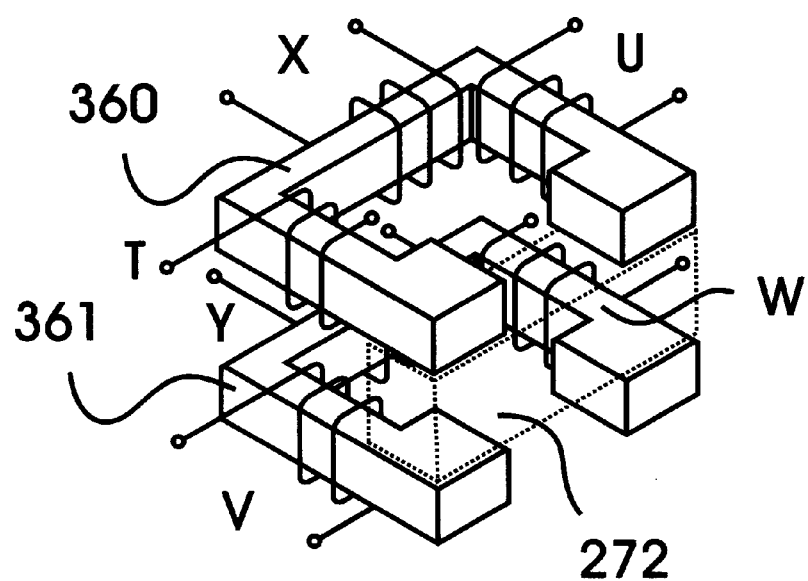
FIG. 23 is a drawing of a linear device constructed according to the present invention, having dual active control-flux sources, perpendicular to the axis of conversion, and located at the top and bottom of the assembly.

FIG. 23 is a drawing of a perpendicular embodiment having control-flux assemblies located at the top and bottom of energy conversion section 272. The top control-flux assembly consists of a generally U-shaped core 360 having potential coil locations X, T or U, and is capable of producing magnetic flux in the top core of energy-conversion section 272. Similarly, U-shaped core 361 having potential coil locations V, W or Y, is capable of producing magnetic flux in the bottom core of the energy-conversion section 272.

FIG. 24–FIG. 27 are drawings of embodiments of the present invention having control-flux assemblies located in planes generally parallel to plane of the energy-conversion section.

Figure 24:
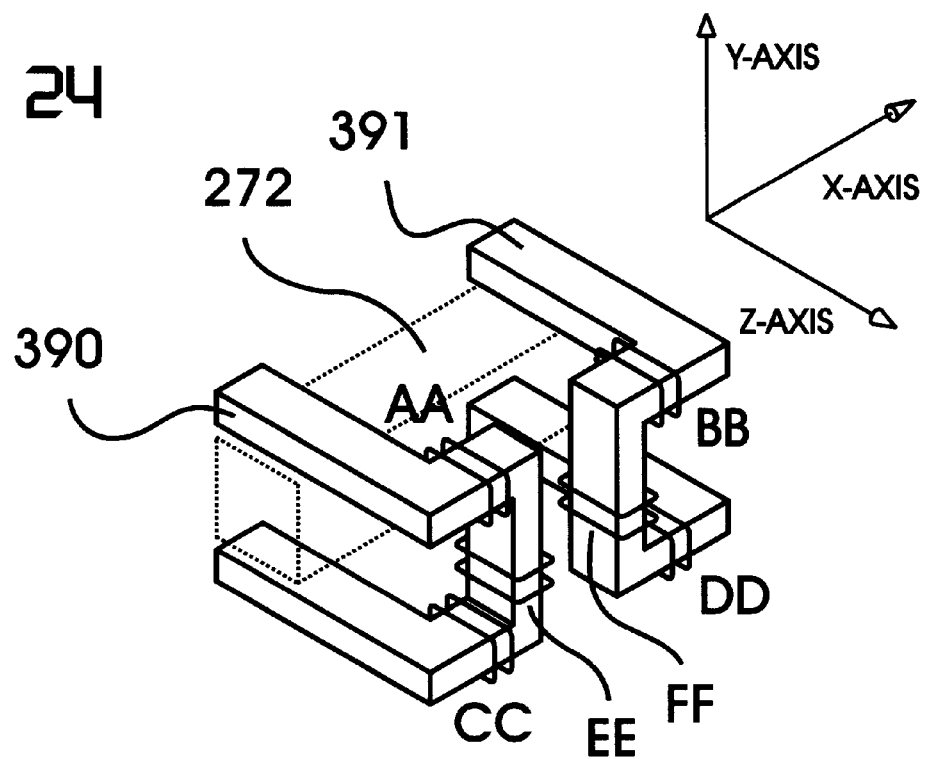
FIG. 24 is a drawing of a linear device constructed according to the present invention, having dual active control-flux sources in a single plane parallel to the conversion axis.

FIG. 24 depicts an embodiment having two control-flux assemblies located in a parallel plane in front of the energy-conversion section. A first control-flux assembly consists of a ferromagnetic core 390 having a U-shaped portion extending rightward, defining coil locations AA, CC or EE, and has protrusions from each end of the U-shaped section, at the top and bottom, for carrying flux to the top and bottom of the left end of energy-conversion section 272. Similarly, core 391 extends leftward, has defined coil locations BB, DD or FF, and provides flux for the top and bottom of the right end of energy conversion section 272.

Figure 25:
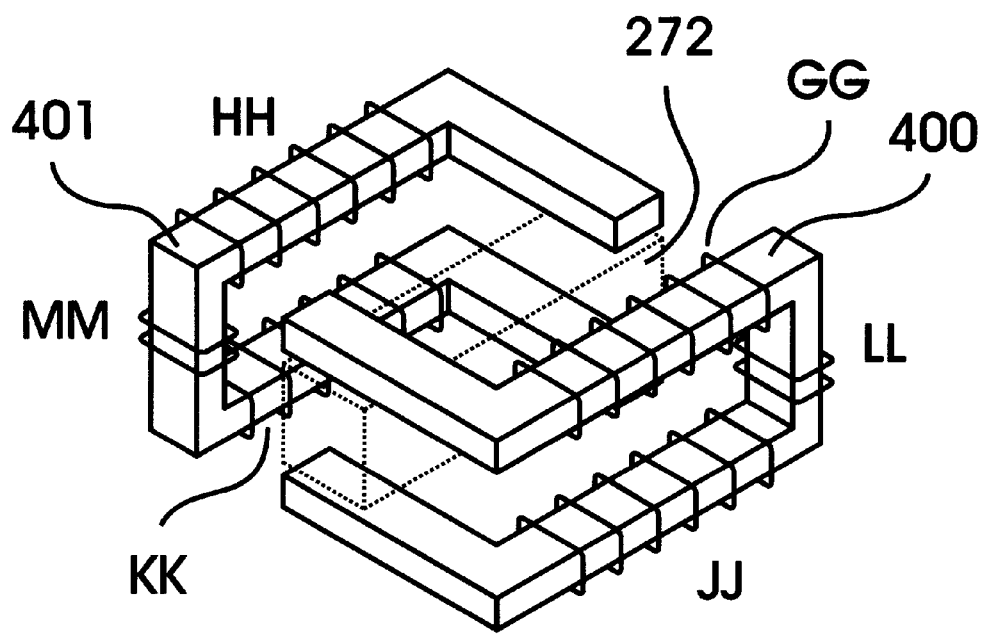
FIG. 25 is a drawing of a linear device constructed according to the present invention, having dual active control-flux sources in front and rear planes parallel to the conversion axis.

FIG. 25 shows an embodiment of the present invention which provides increased coil space, compared to that of FIG. 24, by utilizing space in dual parallel planes both in front of, and behind the energy-conversion section 272. A first control-flux assembly, located in a front parallel plane, consists of a ferromagnetic core 400 having a U-shaped portion extending to the right, defining coil locations GG, JJ or LL, and has protrusions from each end of the U-shaped section, at the top and bottom, for carrying flux to the top and bottom of the left end of energy-conversion section 272. Similarly, a second control-flux assembly has core 401 extending leftward, defining coil locations HH, KK or MM, and provides flux for the top and bottom of the right end of energy-conversion section 272.

Figure 26:
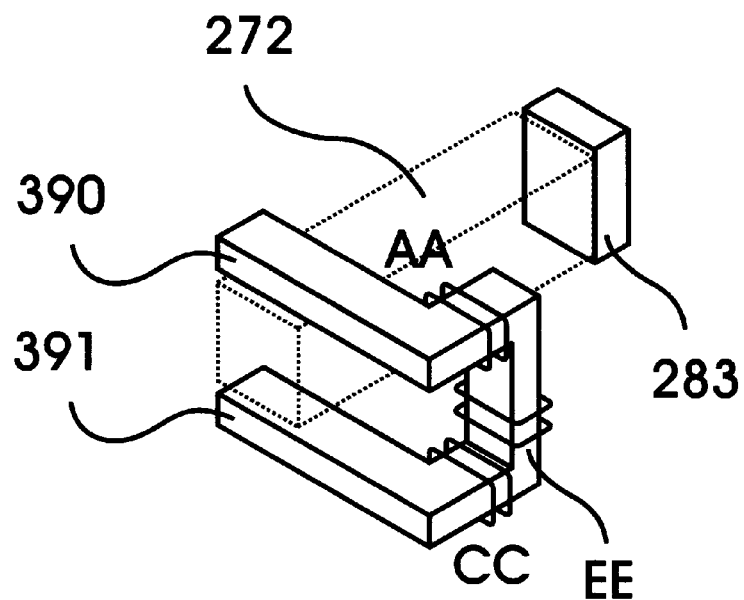
FIG. 26 is a drawing of a linear device constructed according to the present invention, having 1 active control-flux source in a single plane parallel to the conversion axis, and having a passive flux-conducting end-path.
Figure 27:
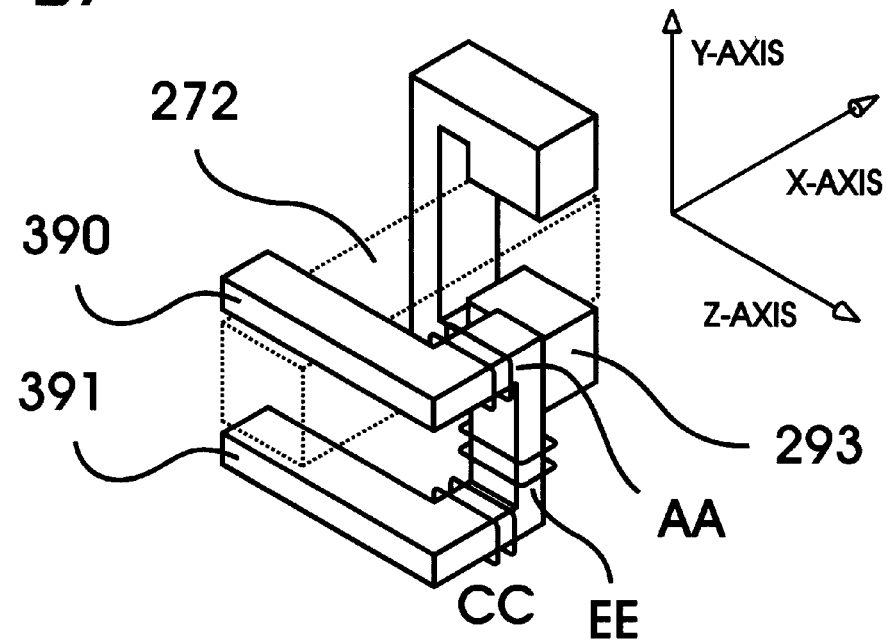
FIG. 27 is a drawing of a linear device constructed according to the present invention, having 1 active control-flux source in a single plane parallel to the conversion axis, and having a passive flux-conducting side path.

FIG. 26 is a drawing of a parallel embodiment with an active control-flux assembly at the left end as in FIG. 24, but has a passive, or energy-dissipating, end 283, in the form of a simple rectangular plate, for returning flux at the right end.

In the embodiment of FIG. 26, as the armature magnet, 201 of FIG. 12, travels to the right, it will be attracted to end-plate 283. The embodiment of FIG. 27 averts this potential problem by using a generally U-shaped end 293 which uses exterior surfaces of conversion section 272 to return flux, thereby leaving the travel of magnet 201 unimpeded.

Figure 28:
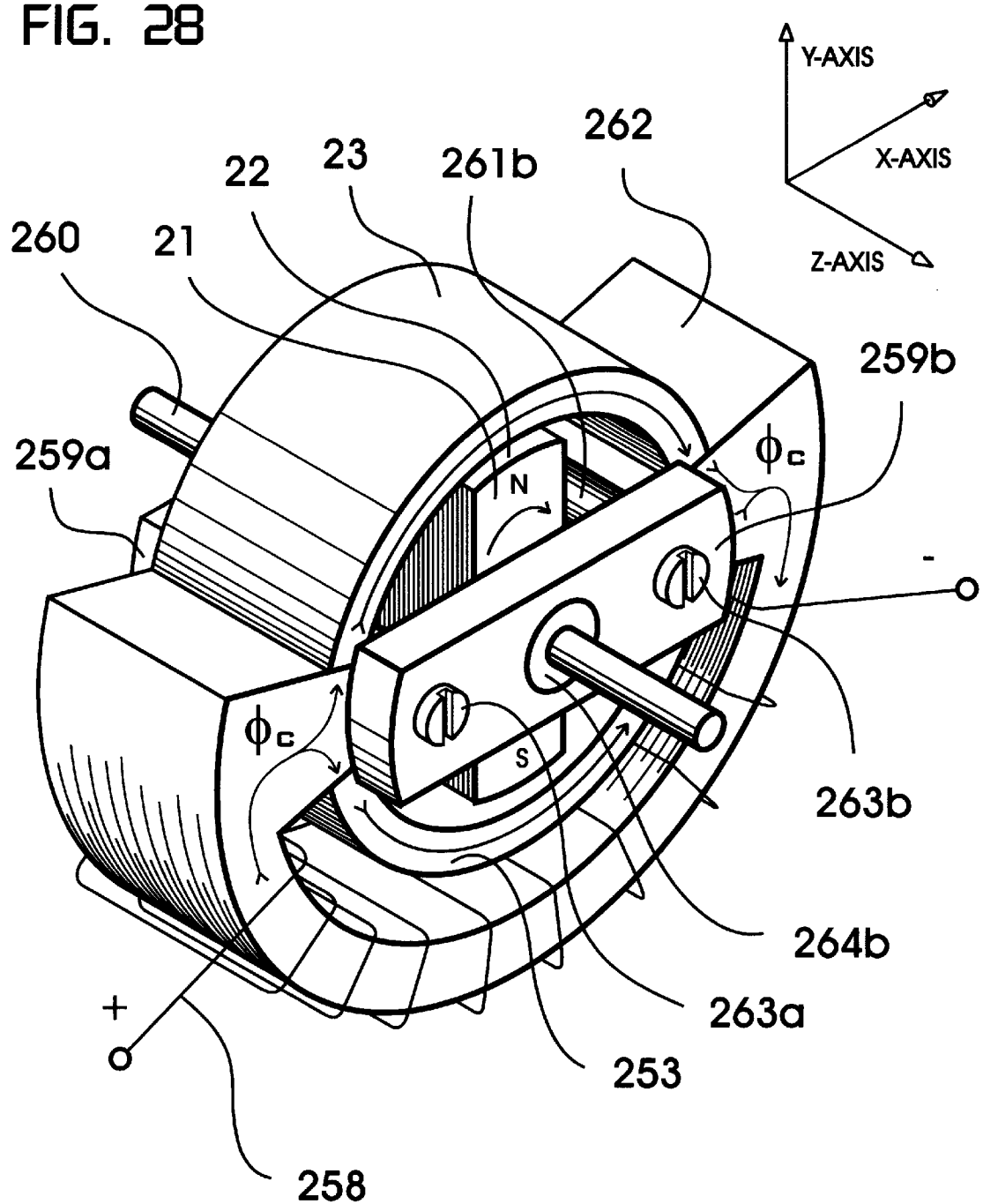
FIG. 28 is a drawing of a rotary device constructed according to the present invention, having ring-shaped energy-conversion cores, 2 magnetic poles, and a coplanar active control-flux source.

FIG. 28 is a perspective drawing of a preferred rotary embodiment constructed according to the present invention. The control-flux assembly consists of a generally half-ring shaped core 262 with coil winding 258 for producing control flux $\phi_c$. Control flux $\phi_c$ travels from the left end of control core 262, divides and flows through top half-ring conversion core 23, and bottom half-ring conversion core 253, returning to the right end of control core 262. This closed magnetic circuit for control flux is characteristic of the present invention. Permanent magnet 21 produces flux $\phi_m$ which travels from surface 22, into half-ring conversion core 23, then travels both clockwise and counterclockwise through core 23 and core 253, and then enters pole S of magnet 21. Thus, the permanent magnet also experiences a closed magnetic circuit, characteristic of the present invention. Such closed magnetic circuits result in high conversion efficiency.

Dual end supports 259a and 259b contain bearings such as 264b for journaling shaft 260 to which magnet assembly 21 is securely fastened. Spacers/end-stops such as 261b and associated fasteners such as 263a and 263b secure end supports 259a and 259b to each other and to the assembly. End-stops are preferably constructed of concentric tubular energy-absorbing materials as described above for the linear preferred embodiment of FIG. 13.

When Voltage of polarity as indicated by+and−is applied to coil 258, the right-hand rule dictates that control flux $\phi_c$ will flow in the direction shown, through top energy-conversion core 23 and bottom conversion core 253. The N pole of magnet 21 will be forced to the right, in the direction of the control flux $\phi_c/2$, while the S pole of magnet 21 will be forced to the left, opposite to the control flux $\phi_c/2$. Thus, the two forces cooperate to produce a torque or moment about the axis of the shaft 260. As in all rotary embodiments of the present invention, reversing polarity of the electrical input will reverse the direction of the torque output.

Figure 29:
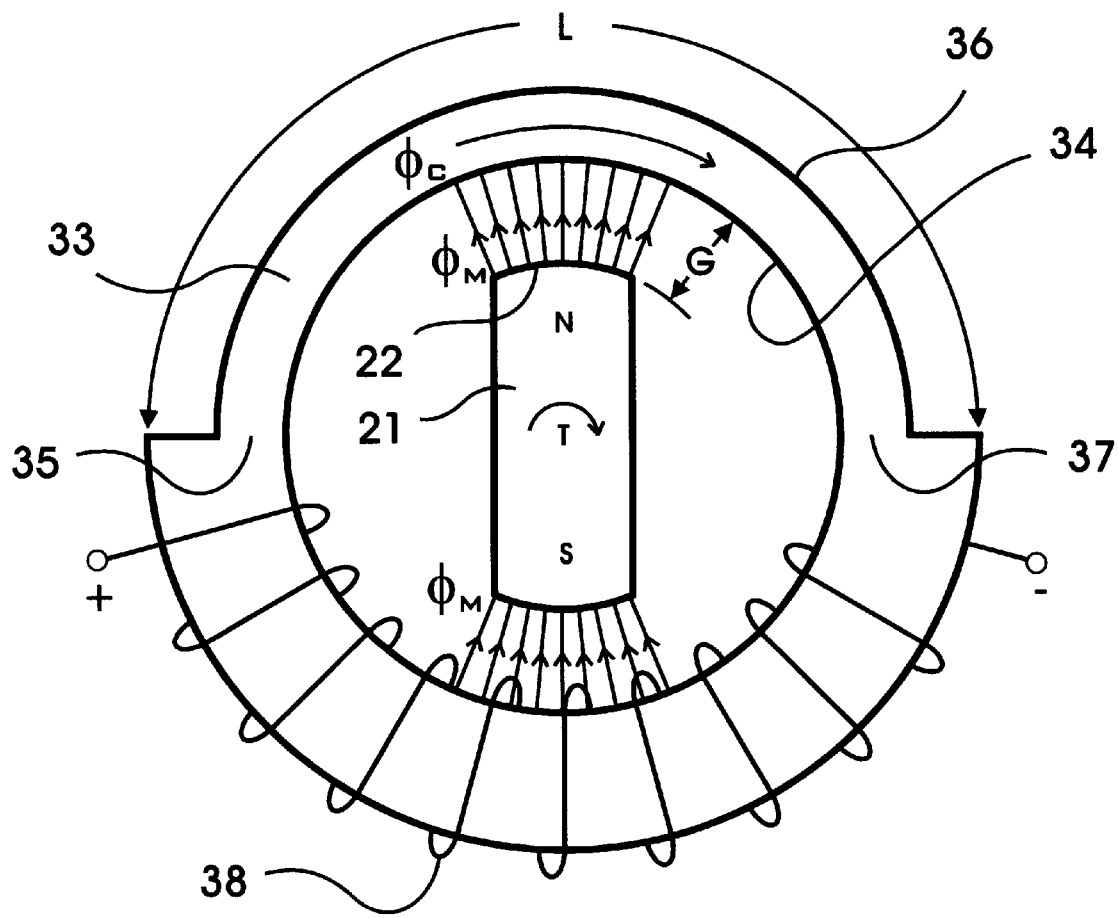
FIG. 29 is a drawing of a rotary device constructed according to the present invention, having a coplanar active control-flux source, having a first magnetic N pole operating according to the present invention and having a second magnetic S pole operating according to prior art.

FIG. 29 is a drawing of a hybrid actuator, combining prior art with technology of the present invention. The N pole of magnet 21 generates force according to the present invention and the S pole of magnet 21 generates force according to the well-known equation $$f_i = ILB,$$

where $f_i$ is the force, in Newtons, acting upon pole S, I is the current in coil 38, in Amperes, and L is the length of the portion of coil 38, in meters, in a magnetic field density of B Webers per square meter, due to $\phi_m$ emanating into pole S.

The embodiment of FIG. 29 consists of a generally ring-shaped ferromagnetic core 33, having a thicker bottom portion and a substantially thinner top portion. A coil 38, for receiving electrical energy, is located on the thicker bottom portion, and generates a control flux $\phi_c$ which flows around the ring-shaped core 33. A generally bar-shaped magnet 21, smaller in length than the inside diameter of core 33, and having a north magnetic pole N and south magnetic pole S, is constrained to rotate about a center as shown. Magnetic flux $\phi_m$ travels from the N pole of magnet 21 through the magnet surface 22 and through a clearance gap G to inside surface 34 of core 33. The flux $\phi_m$ then divides and travels both clockwise and counterclockwise through core 33, then exits core 33 and enters the S pole of magnet 21.

In the embodiment of FIG. 29, the bottom of ring-shaped ferromagnetic core 33 is substantially enlarged so as to generate negligible magnetic intensity in the core, and therefore core-energy force on the S pole of magnet 21 is negligible as indicated by the equation $$f = H_c \phi_m,$$

where f is force, in Newtons, $H_c$ is magnetic intensity, in Amperes per meter, developed by $\phi_c$ in the bottom portion of core 33 and $\phi_m$ is the magnetic flux, in Webers, entering the S pole of magnet 21. Thus, the core-energy force of the present invention, which would oppose the force first described above, is negligible on the S pole of magnet 21, and it is forced to the left by conventional forces as described. The top of ring-shaped core 33 has substantially reduced area and is an active field-energy conversion region according to the present invention. Force on the top N pole of magnet 21 is directed to right, in the direction of $\phi_c$, and cooperates with the left-directed force on the S pole to generate a torque or moment T as shown, about the center axis of magnet 21. As in all rotary embodiments of the present invention, reversing polarity of the electrical input will reverse the direction of the torque output.

Figure 30:
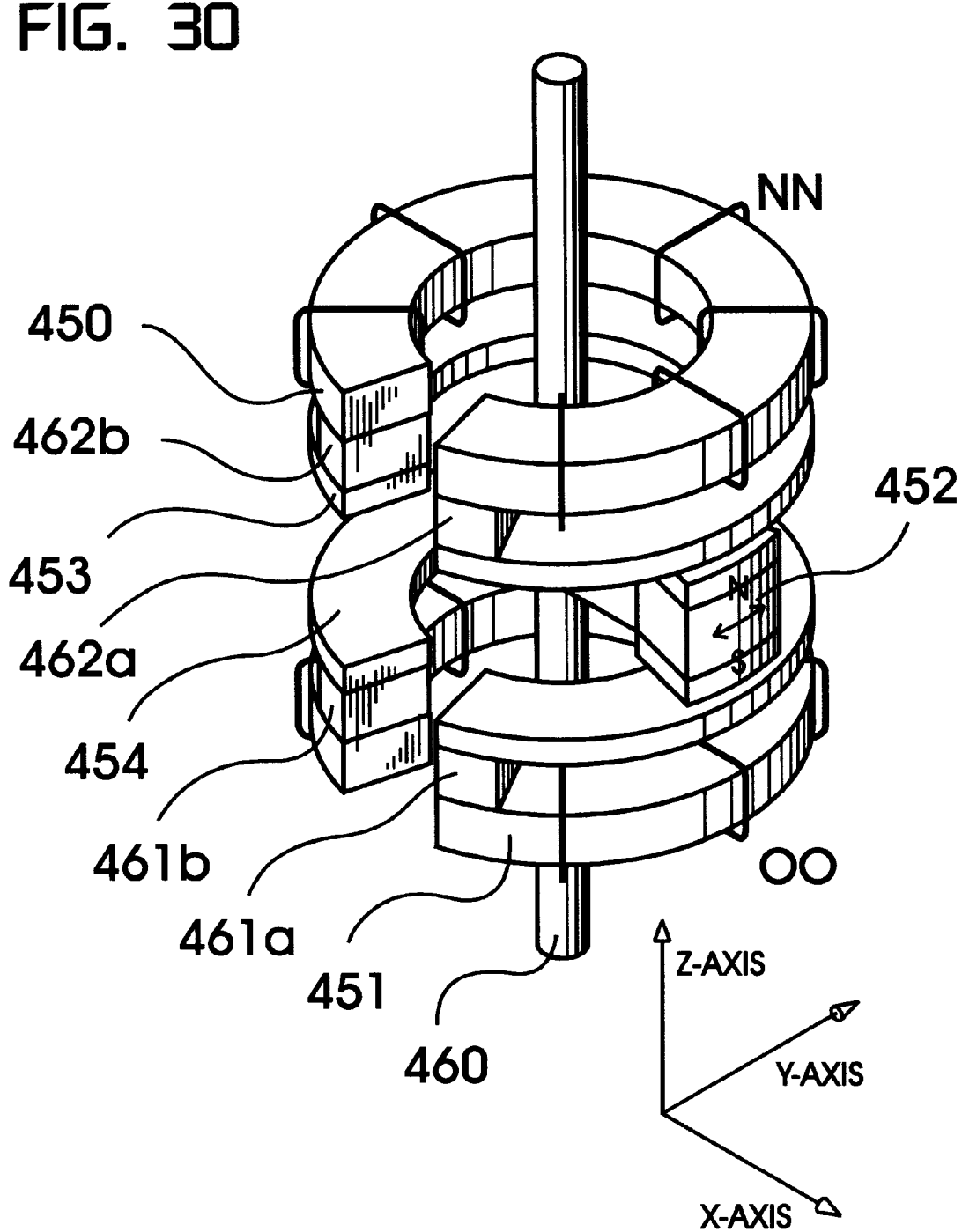
FIG. 30 is a drawing of a rotary device constructed according to the present invention, having washer-shaped energy-conversion cores, 2 magnetic poles, and active control-flux sources located in parallel planes above and below the plane of armature motion.

FIG. 30 is a drawing of a rotary embodiment of the present invention, constructed after FIG. 3, having members shaped like segments of washers, having 2 magnetic poles and having control-flux sources located in parallel planes above and below the centrally-located energy-conversion section. In FIG. 30, a top control-flux assembly has a ferromagnetic, washer-shaped core 450 with electromagnet coil location NN which generates control flux upon application of electrical power to the coil. Ferromagnetic pole-pieces 462a and 462b carry the generated flux into the top energy conversion core 453. Likewise, a bottom control-flux assembly has a ferromagnetic, washershaped core 451 with electromagnet coil location OO to generate control flux upon application of electrical power. Ferromagnetic pole-pieces 461a and 461b carry the generated flux into the bottom energy-conversion core 454. The above control-flux sources cooperate to provide magnetic flux in a first direction (clockwise or counterclockwise) in the top core 453 and in a second, opposing direction (counterclockwise or clockwise) in bottom core 454. Ferromagnetic energy-conversion cores 453 and 454 are of substantially reduced cross-section as compared to control-flux cores 450 and 451, to ensure that substantially all of the magnetomotive force developed by the coils at locations NN and OO is utilized respectively by cores 453 and 454, as required for high conversion efficiency in the present invention. Magnet assembly 452 is radially attached to a rotatable cylindrical shaft 460 which is suitably journaled to constrain the magnet 452 to a circular path between the interior faces of conversion cores 453 and 454.

To produce counterclockwise torque, electrical energy is applied to generate counter-clockwise magnetic flux in core 453 and clockwise magnetic flux in core 454. Conversion of magnetic field energy in core 453 then produces a counter-clockwise force on the N pole of magnet 452 and likewise field energy conversion in core 454 cooperates, producing an additional counterclockwise force on the S pole of magnet 452. As in all embodiments of the present invention, reversing the electrical input will reverse the torque.

Since armature travel in embodiments of the present invention is relatively unobstructed, a plurality of control-flux sources, having overlapping regions of influence, can easily be placed along the energy-conversion cores. If these sources are sequentially switched, or property commutated, the present invention acts as a linear or rotary motor, respectively with high force or torque, and unlimited travel.

Figure 31:
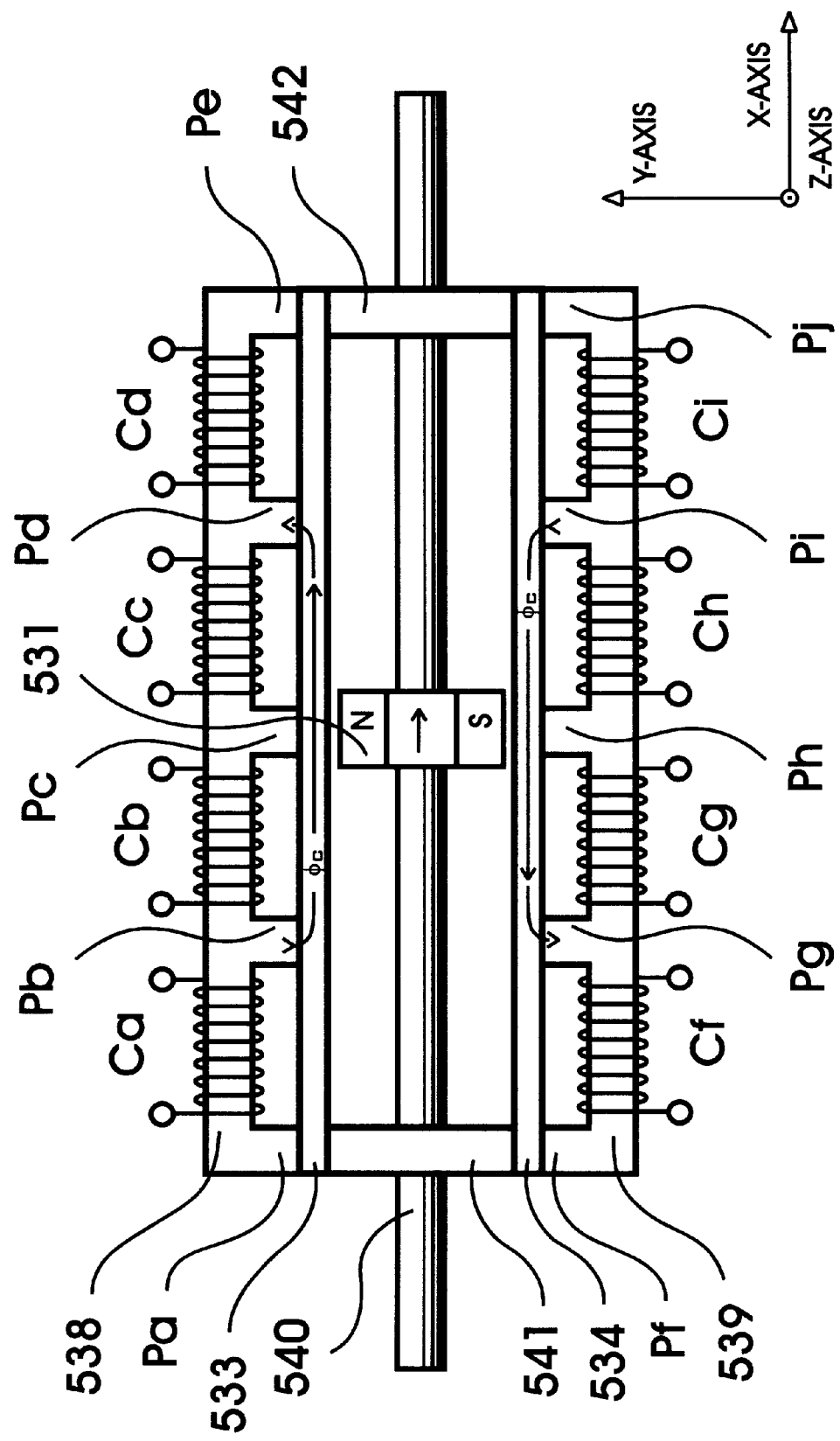
FIG. 31 is a drawing of a linear device constructed according to the present invention, having a plurality of control-flux sources, coplanar with the conversion axis, located at the top and bottom of the assembly and areas of influence overlapping by 50%, for the generation of stepped motion or continuous motion between fixed end-stops.

FIG. 31 is a drawing of a linear embodiment of the present invention, designed as a linear motor for extended travel. Although designed with four sets of coils which may be sequentially switched in three groups, any number of coils may be used to produce extended armature travel. A first, top control-flux assembly has a ferromagnetic core 538 with five equally-spaced salient poles Pa–Pe between which are wound four electromagnet coils Ca–Cd. Salient poles Pa–Pe carry flux into a top ferromagnetic energy-conversion core 533 of substantially reduced cross-section as compared to flux supply core 538. Likewise, a second, bottom control-flux assembly has a ferromagnetic core 539 with five equally-spaced salient poles Pf–Pj between which are wound four electromagnet coils Cf–Ci. Salient poles Pf–Pj carry flux into a bottom ferromagnetic energy-conversion core 534 of substantially reduced cross-section as compared to flux supply core 539. End supports 541 and 542 define a space between cores 533 and 534 for magnet assembly 531, which is fixed to a shaft 540 journaled by suitable bearings located in end supports 541 and 542. Thus, magnet 531 is constrained to travel linearly, parallel to the interior surfaces of conversion cores 533 and 534.

In FIG. 31, The armature magnet 531 is at the midpoint of travel and a group of four coils Cb, Cc, Cg and Ch are on. At the top, coils Cb and Cc cooperate to generate a first control flux $\phi_c$ flowing to the right in energy-conversion core 533. Similarly, at the bottom, coils Cg and Ch cooperate to generate a second control flux $\phi_c$ flowing to the left in energy-conversion core 534. Control flux does not flow in salient poles Pc or Ph, since no magnetomotive force or magnetic potential exists across these members. These control fluxes $\phi_c$ interact with the N and S poles of magnet 531 to produce a force to the right, as long as the magnet 531 is located between salient poles Pb and Pd. Similarly, when the magnet travels near Pd, a second group of coils Cc, Cd, Ch and Ci are energized, and a force to the right will be generated between salient poles Pc and Pe. Thus, sequentially switching the coils in groups of four will produce a force to the right over the entire length of travel. As in all embodiments of the present invention, reversing the electrical polarity of the coils will reverse the control flux which will reverse the direction of travel of the armature magnet 531. Thus for armature 531 to travel to the left (from the right extremity), it is necessary to reverse the electrical polarity, and then switch the three coil groups in sequence from right to left, that is, Cc-Cd-Ch-Ci, Cb-Cc-Cg-Ch and then Ca-Cb-Cf-Cg.

Figure 32:
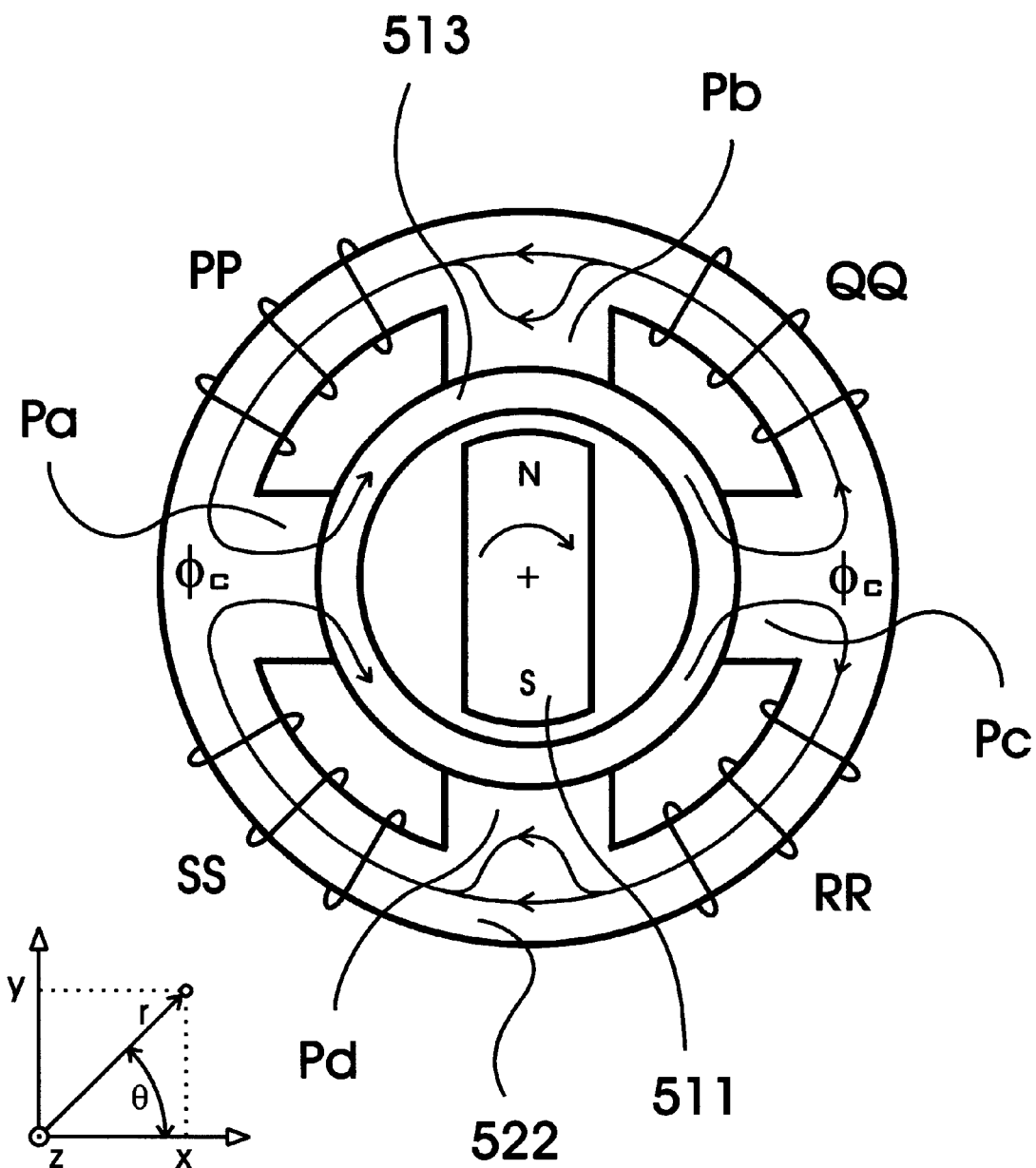
FIG. 32 is a drawing of a rotary device constructed according to the present invention, having a ring-shaped energy-conversion core, having a plurality of control-flux sources, coplanar with the plane of magnet rotation and having areas of influence overlapping by 50%, for the generation of stepped motion or continuous motion.

FIG. 32 is a drawing of a rotary embodiment of the present invention, constructed after FIG. 28, but having a plurality of control-flux sections with overlapping regions of influence, in order to produce continuous unlimited rotary motion, as in a rotary motor. Substantially ring-shaped ferromagnetic control-flux core 522 has four equally-spaced salient poles Pa–Pd on the inside diameter, defining four inter-pole electromagnet coil locations PP, QQ, RR and SS, and abutting a ferromagnetic energy-conversion ring core 513 having substantially reduced cross-section as compared to flux supply core 522. A magnet or magnet assembly 511, substantially bar-shaped with cylindrical faces, and of slightly less outside dimension than the internal diameter of ring core 513, is journaled with suitable bearings to rotate within core 513.

In FIG. 32, electrical energy is applied to the top coil combination PP–QQ and the bottom coil combination RR–SS to produce control flux $\phi_c$ flowing to the right in both the top half and bottom half of energy-conversion core 513. This will produce clockwise torque on rotor magnet 511 which will diminish to zero as the center of magnet pole N approaches the center of salient pole Pc. However, at or near that position, coil combination QQ–RR and SS"PP can be energized to produce flux flowing downward in both the left and right halves of core 513, and rotor magnet 511 will travel toward salient pole Pd. If coil groups are thus energized in a sequence to produce 90-degree clockwise shifts in the flux pattern of the energy-conversion core 513, rotor magnet 511 will continue to rotate clockwise indefinitely. Likewise, reversing coil polarity and energizing coil groups in a counter-clockwise sequence will result in counterclockwise rotation of magnet 511. The ability to reverse torque and direction by reversing the electrical input is characteristic of all embodiments of the present invention.

Figure 33:
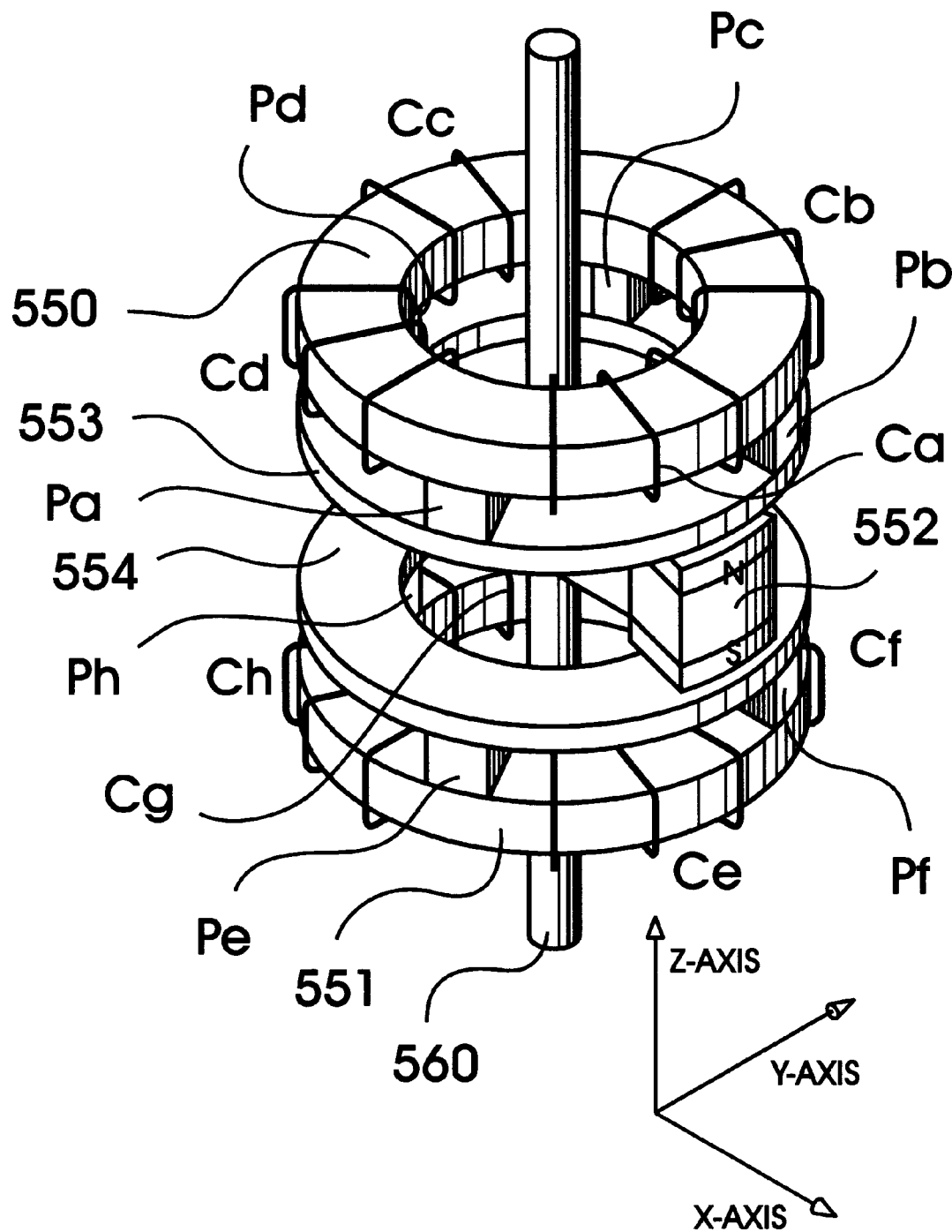
FIG. 33 is a drawing of a rotary device constructed according to the present invention, having washer-shaped energy-conversion cores, having a plurality of control-flux sources, located in planes above and below the axis of magnet rotation and having areas of influence overlapping by 50%, for the generation of stepped motion or continuous motion.

FIG. 33 is a drawing of a rotary embodiment of the present invention, constructed after FIG. 30, but having a plurality of control-flux sections with overlapping regions of influence, in order to produce continuous unlimited rotary motion, as in a rotary motor. A top, washer-shaped ferromagnetic control-flux core 550 has four equally-spaced pole pieces Pa–Pd located on the under surface, defining four inter-pole electromagnet coil locations Ca–Cd, and abutting a ferromagnetic energy-conversion washer-shaped core 553 having substantially reduced crosssection as compared to flux supply core 550. Similarly, a bottom, washer-shaped ferromagnetic control-flux core 551 has four equally-spaced pole pieces Pe–Ph located on the top surface, defining four inter-pole electromagnet coil locations Ce–Ch, and abutting a ferromagnetic energy-conversion washer-shaped core 554 having substantially reduced cross-section as compared to flux supply core 551. A magnet or magnet assembly 552, substantially bar-shaped, and of slightly less vertical dimension than the vertical spacing of washer-shaped cores 553 and 554, is attached with a radial arm to a shaft 560, which is journaled with suitable bearings to allow magnet 552 to rotate between cores 553 and 554. For increased efficiency, a second magnet assembly (not shown) may be attached, diametrically-opposed mechanically and oppositely poled magnetically.

In FIG. 33, electrical energy is applied to the top coils Ca–Cd and the bottom coils Ce–Ch to produce control flux $\phi_c$ flowing to the right, from pole Pa to pole Pc in top core 553 and flowing to the left in bottom core 554. This will produce counterclockwise torque on rotor magnet 552 which will diminish to zero as the center of magnet 552, pole N, approaches the center of pole-piece Pc. However, at or near that position, coils Ca–Cd and Ce–Ch can be energized so as to produce torque until rotor magnet 552 approaches pole-piece Pd. If coil groups are thus energized in a sequence to produce 90-degree counterclockwise shifts in the flux pattern of the energy-conversion cores 553 and 554, rotor magnet 552 will continue to rotate counterclockwise indefinitely. Likewise, reversing coil polarity and energizing coil groups in a clockwise sequence will result in clockwise rotation of magnet 511. The ability to reverse torque and direction by reversing the electrical input is characteristic of all embodiments of the present invention.

Figure 34:
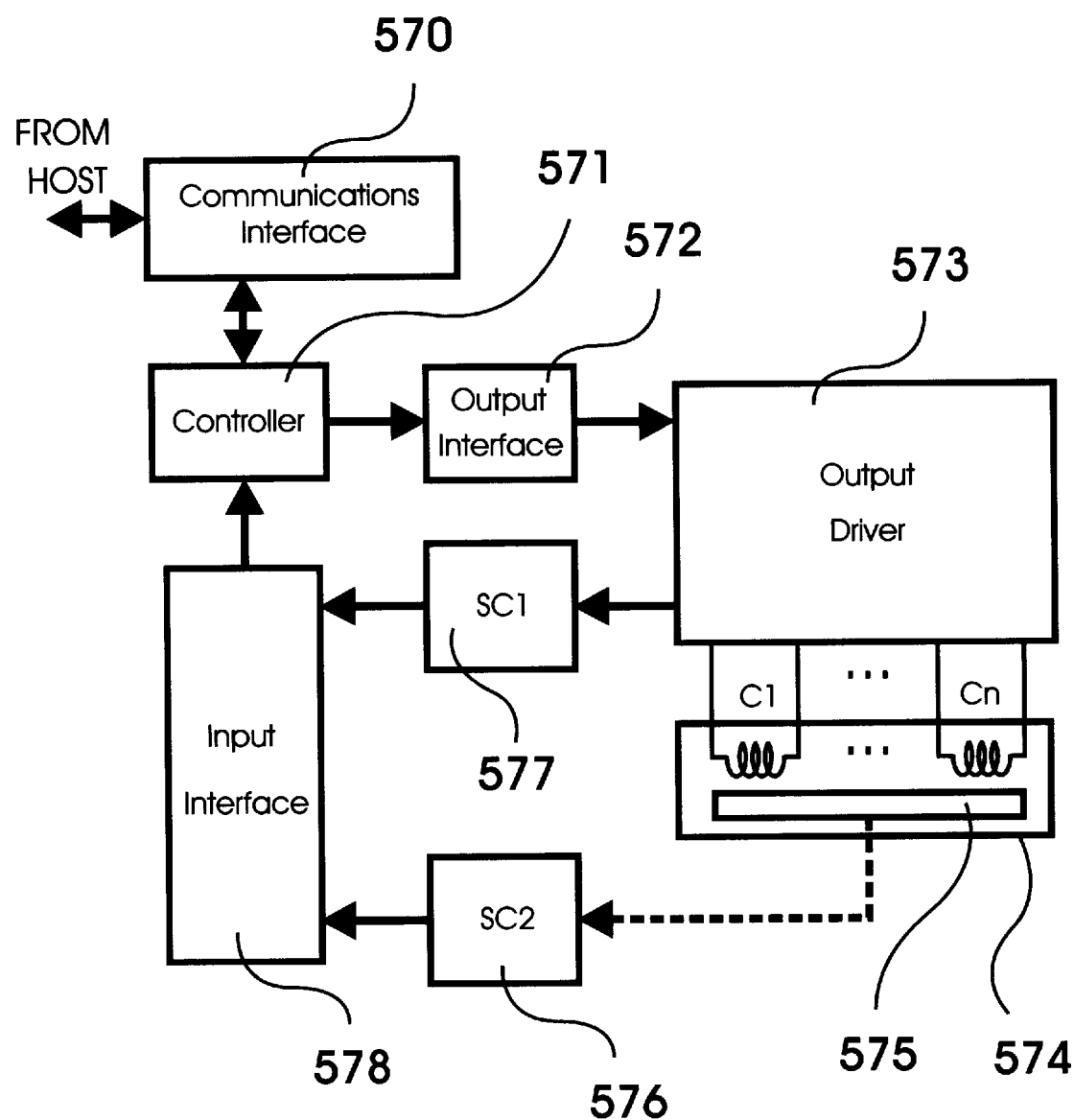
FIG. 34 is a functional or block diagram of a servo control system utilizing a device constructed according to the present invention.

FIG. 34 is a drawing showing a functional or block diagram of a servo control system which uses an actuator constructed according to the present invention. Operation begins when the system receives an input command from an external device such as a host computer, or perhaps a simpler manual device such as a rotary switch or dip switch. Input command information is transferred to the controller 571 by a communications interface 570, which is preferably a bidirectional RS-232 serial digital interface. If the host is a computer, such as an IBM-compatible PC, status or other information may be sent back to the host. The controller 571 is preferably a microcontroller with serial communications interface 570, Analog-to-digital converters for input interface 578 and digital-to analog outputs or pulse-width modulation outputs for output interface 572 all contained internally. The controller 571 should also have sufficient data memory (RAM) and program memory (ROM) for implementing control algorithms, and storage of programs or look-up tables. The controller 571 provides both digital and PWM inputs to the output interface 572 defining which coils of actuator 574 are activated and what analog energy level is applied to each. Output interface 572 then provides proper, level-shifted drive signals for turning on or off the transistors in power output driver 573, which preferably uses switch-mode technology. Signal-conditioning circuitry 577 (SC1) monitors the input status and levels of actuator coils C1–Cn and converts inputs to proper signals for the controller input interface 578. Signal-conditioning circuitry 576 (SC2) monitors the actuator output and provides proper signals, representing such variables as position, velocity and acceleration, to the controller input interface 578. Thus, the system of FIG. 34 can use controller 571 and associated peripheral circuitry to implement control algorithms for use with any of the actuators of the present invention.

While the forms of apparatus and methods of operation described herein constitute preferred embodiments of the present invention, other obvious forms are known to exist. Most notable are:

1. The permanent magnets of the present invention may be held stationary, and the control-flux assemblies allowed to move. This is not preferred, since the control-flux assemblies are usually massive and slow.
2. The relative locations of the permanent magnets and the control-flux assemblies may be interchanged, that is, the permanent magnets may be located toward the external extremities of the assembly and control-flux assemblies may be located in the interior of the assemblies. Again, this is normally not preferred, since it tends to make the magnet assemblies substantially more massive.
3. When the present invention is realized as in 1, above, the mass may be greatly reduced by allowing only necessary portions of the control-flux assembly to move. That is, the coils and almost all of the core, excepting those portions which are immediately adjacent to the energy-conversion cores, may be held stationary. This is not preferred, since air gaps must be introduced in the control-flux magnetic circuit, resulting in gapped or open magnetic circuits and lower conversion efficiency.

It is to be understood that the invention is not limited to those precise forms of apparatus and method described in the preferred embodiments, and that changes, such as changing the number of operating magnetic poles on either the stator or armature, may be made therein without departing from the spirit and scope of the invention.

What is claimed is:

1. An electromagnetic device which realizes electromechanical energy conversion by changing the magnetic field energy internal to ferromagnetic linear or curved, bar-shaped members, the said internal field energy being changed by flux from the pole of a permanent magnet as it moves at a constant distance from, and along, a lateral surface of each bar, having an output force given by the equation, $$f=H_c\phi_m,$$

where f is force in Newtons, $H_c$ is the internal magnetic intensity of the bar in Amperes per meter and $\phi_m$ is the flux entering the core from the magnet, and comprising:

a plurality of first magnetic circuits having no air gap, each consisting of a low-reluctance ferromagnetic core upon which is wound coil means for a source of magnetomotive force, in series with a ferromagnetic core having at least five-times greater reluctance, wherein a region of high magnetic field energy is generated by the said coil means and low-reluctance core combination, second magnetic circuits, having one or more permanent magnets, with flux perpendicular to the flux of said ferromagnetic high-field-energy cores of said first magnetic circuits, said permanent magnets being constrained to move in paths such that at least one pole travels close to, and at a constant distance from, a lateral surface of said ferromagnetic high-field-energy cores of said first magnetic circuit, thereby forcing additional flux into the said region of high magnetic field energy, said flux being returned by the low-reluctance path of the said first magnetic circuit, said additional flux combining within the said region to produce magnetic field energy changes which generate useful force output on the movable said permanent magnets, which may be transmitted to mechanically-attached members, such as a journaled output shaft, and adjustable or fixed mechanical stops, consisting of three respective layers of tough, energy-absorbing and rigid materials, located at the extremities of travel of the said permanent magnets.

2. The electromagnetic device of claim 1, wherein said permanent magnet(s) have mechanically-opposed magnetic poles and opposing said regions of high magnetic field energy, such that lateral tractive magnetic forces between the said poles and the said high-field-energy cores are cancelled and bearing frictional losses are minimized.

3. The electromagnetic device of claim 1, wherein said ferromagnetic high-energy cores are linear.

4. The electromagnetic device of claim 1, wherein said ferromagnetic high-energy cores are circular rings or portions thereof and said permanent magnets have said poles which move along an inside diameter of the said rings.

5. The electromagnetic device of claim 1, wherein said ferromagnetic high-energy cores are circular washers or portions thereof and said permanent magnets have said poles which move along the lateral surfaces of the said washers.

6. The electromagnetic device of claim 1, wherein said ferromagnetic high-energy cores are circular double helices and said permanent magnets have said poles which move in helical paths along the inside diameter of the said double helices.

7. The electromagnetic device of claim 1, wherein said ferromagnetic high-energy cores are circular double helices and said permanent magnets have said poles which move in helical paths between the lateral sides of the coils formed by the said double helices.

8. The electromagnetic device of claim 1, further comprising:

a linear Hall sensor and two ferromagnetic strips, half the length of the said core, approximately 0.8 mm thick and of width equal to the said core;

wherein the strips are formed and mounted in close proximity, <0.25 mm, one to each half of a lateral surface of a said high-energy core, each strip having a protruding portion formed perpendicularly outward from, and centrally located with respect to, the lateral surface of the said high-energy core, defining a space between said portions sufficient for receiving the Hall sensor, for the purpose of monitoring magnetic leakage flux of the said core, and thereby determining the magnetic state and corresponding said permanent magnet/armature position.

9. The electromagnetic device of claim 1, further comprising:

a coil of thin wire, of material such as insulated copper, less than 0.3 mm diameter;

wherein the said wire is progressively wound in a single layer on the surface of a said high-energy core, and is chosen to be of small diameter, less than half the gap between a said magnet pole and the cooperating said high-energy field core;

for the purpose of generating a Voltage at the said coil terminals proportional to the velocity of a said permanent magnet, magnitude and polarity being given by Faraday's law of induction.

10. The electromagnetic device of claim 1, wherein material having high magnetic hysteresis losses is used for the said ferromagnetic high-energy cores, to provide mechanical braking and/or maintain the position of said permanent magnets when electrical power is removed.

11. The electromagnetic device of claim 1, further comprising:

a thick conductive strip or a coil of insulated wire, of material such as copper, with finished thickness dimension greater than 0.5 mm;

Wherein the said conductive strip or coil is wrapped around a fraction of the length of a said high-energy core at the position(s) where damping is desired, and when electrically shorted, will have electrical current due to Voltage induced by the motion of a said permanent magnet and the associated flux, magnitude and polarity being given by Faraday's law of induction, and will produce, according to Lenz's Law, a force opposing the original motion, that is, a damping force, when flux from the said magnet is at the location of the electrically-shorted said strip or coil.

12. The electromagnetic device of claim 1, wherein the cross-sectional area of a said ferromagnetic high-energy core varies along the length, the varying cross-sectional area resulting in inverse variation in magnetic reluctance, resulting in a corresponding inverse variation in magnetic intensity $H_c$ and, since actuator output force or torque is directly proportional to magnetic intensity $H_c$, an inverse variation in output; thus modifying or tailoring the actuator force/torque versus position to match mechanical load requirements.

13. The electromagnetic device of claim 1, wherein the surface contour of a said ferromagnetic high-energy core varies along the length. The varying surface contour, being adjacent to the path of the pole of a said permanent magnet, will vary magnet flux, a wider gap resulting in less flux and a shorter gap resulting in greater flux; since actuator output force or torque is directly proportional to said magnet flux, the output actuator force/torque versus position can be designed to match mechanical load requirements.

14. The electromagnetic device of claim 3, further defined by a rectangular cavity formed by parallel top and bottom horizontal rectangular bars, vertically-spaced and functioning as the said ferromagnetic high-field-energy cores, a said permanent magnet, substantially bar-shaped, length-wise magnetized and having a north and south pole, with axis positioned vertically, constrained to move horizontally within the said rectangular cavity with said poles moving adjacent to the inside surfaces of the said rectangular bars, having an affixed output member, such as a journaled shaft, said low-reluctance sources of magnetomotive force located at each end of the said rectangular bars, and adjustable or fixed mechanical stops, of layered tough, energy-absorbing and rigid materials, located at the extremities of travel of the said permanent magnet.

15. The electromagnetic device of claim 1, wherein the said sources of magnetomotive force, the said ferromagnetic high-field-energy cores and paths of said permanent magnets are located in the same plane.

16. The electromagnetic device of claim 1, wherein the said sources of magnetomotive force are located in a plane perpendicular to the plane containing the said ferromagnetic high-field-energy cores and paths of said permanent magnets.

17. The electromagnetic device of claim 1, wherein the said sources of magnetomotive force are located in a single plane parallel to the plane containing the said ferromagnetic high-field-energy cores and paths of said permanent magnets.

18. The electromagnetic device of claim 1, wherein the said sources of magnetomotive force are located in parallel planes on both sides of the plane containing the said ferromagnetic high-field-energy cores and paths of said permanent magnets.

19. The electromagnetic device of claim 4, further defined by a horizontal cylindrical cavity formed by top and bottom half-rings functioning as said ferromagnetic high-field-energy cores, a said permanent magnet, substantially bar-shaped with north magnetic pole at one end and a south pole at the opposite end, constrained and of dimension small enough to rotate within the defined cylindrical cavity with said poles traversing an inside circular path adjacent to the inside diameter of the said cylindrical cavity, and affixed to a member, such as a cylindrical journaled shaft, for transmitting mechanical torque to an external load, a said low-reluctance source of magnetomotive force in the form of a ferromagnetic half-ring, of inside diameter larger than the outside diameter of the said half-ring high-field-energy cores, having two diametrically-opposed internal salient poles for transmitting flux to the internal, smaller said half-ring high-field-energy cores and having coil means thereon for receiving electrical energy, and adjustable or fixed mechanical stops, of layered tough, energy-absorbing and rigid materials, located at the extremities of travel of the said permanent magnet.

20. The electromagnetic device of claim 1, further defined by a horizontal cylindrical cavity formed by a top half-ring, functioning as a said ferromagnetic high-field-energy core, and a ferromagnetic bottom half-ring, functioning as a said source of magnetomotive force and having a said coil means that not only receives electrical power but also produces force on an adjacent magnet pole, said bottom half-ring having an inside diameter equal to that of the said top half-ring, and a radial thickness at least two times greater than the said top half-ring, a said permanent magnet, substantially bar-shaped with north magnetic pole at one end and a south pole at the opposite end, constrained and of dimension small enough to rotate within the said cylindrical cavity with said poles traversing an inside circular path adjacent to the inside diameter of the said cylindrical cavity, and affixed to a member, such as a journaled cylindrical shaft for transmitting mechanical torque to an external load.

21. The electromagnetic device of claim 5, further defined by a vertical cylindrical cavity formed by top and bottom, vertically-spaced horizontal washer-shaped segments of less than 360-degree angular length, and functioning as said ferromagnetic high-field-energy cores, a said permanent magnet, substantially bar-shaped, length-wise magnetized and having a north and south pole, with axis positioned vertically, constrained and of dimension small enough to rotate within the vertical length of the defined cylindrical cavity with said poles moving along the inside top and bottom lateral surfaces of the washer-shaped segments, affixed by a radial arm to a central member located on the vertical axis, such as a journaled cylindrical shaft, for transmitting mechanical torque to an external load, said low-reluctance sources of magnetomotive force in the form of similar, but at least two times thicker, washer-shaped circular segments located in horizontal parallel planes at the top and bottom of the assembly, spaced vertically from said ferromagnetic high-field-energy cores in order to accommodate coil means, and having salient poles at each segment end for transmitting magnetic flux to said ferromagnetic high-field-energy cores.

22. The electromagnetic device of claim 1, further defined by a plurality of linear actuator sections, constructed according to the present invention, wherein actuator sections have overlapping force-generating regions, to generate high force and long mechanical travel when actuator sections are energized in sequence; comprising:

a rectangular cavity formed by parallel top and bottom horizontal rectangular ferromagnetic bars, vertically-spaced, each functioning as a plurality, N→2, of said high-field-energy cores, a said permanent magnet, substantially bar-shaped, length-wise magnetized and having a north and south pole, with axis positioned vertically, constrained to move horizontally within the cavity, with said poles moving adjacent to the inside surfaces of the said bars, having an affixed output member, such as a journaled shaft, a plurality, N, of said sources of magnetomotive force both above and below the said horizontal bars, each plurality having a central horizontal core similar to a said rectangular bar, but of at least two times thicker cross-section, and having N+2 equally-spaced salient poles for transmitting flux to a said rectangular bar, the poles producing sufficient vertical space to accommodate N+1 coil means (for receiving electrical energy) between the N+2 salient poles, and adjustable or fixed mechanical stops, consisting of three respective layers of tough, energy-absorbing and rigid materials, located at the extremities of travel of the said permanent magnet.

23. The electromagnetic device of claim 1, wherein said ferromagnetic high-energy cores are circular rings or portions thereof and said permanent magnets have said poles which move along an inside diameter of the said rings, further defined by a plurality of actuator sections, constructed according to the present invention, wherein actuator sections have overlapping torque-generating regions, to generate high torque and continuous angular motion when actuator sections are energized in sequence; comprising:

a cylindrical cavity defined by the interior of a first ferromagnetic ring or tube, functioning as a plurality $N=4n$, where $n=1, 2, \ldots$, of said high-field-energy cores, $2n$ said permanent magnets, substantially bar-shaped, length-wise magnetized and having a north and south pole, arranged radially with equal angular spacing and alternating poles, constrained to rotate within the defined cylindrical cavity with said alternating poles traversing an inside circular path adjacent to the inside diameter of the said cylindrical cavity, and affixed to an output member, such as a journaled shaft, at the rotational axis, a said plurality N of said low-reluctance sources of magnetomotive force spaced angularly around the outside diameter of the first ferromagnetic ring, consisting of a second circular ring-shaped ferromagnetic core of at least two times larger cross-section and larger inside diameter than the outside diameter of said first high-field-energy ring, having N salient poles, equally-spaced around the inside diameter, for transmitting flux to the central first high-field-energy core, and defining spaces to accommodate N said coil means (for receiving electrical energy) between the said N salient poles, and adjustable or fixed mechanical stops, consisting of three respective layers of tough, energy-absorbing and rigid materials, located at the extremities of travel of the said permanent magnet.

24. The electromagnetic device of claim 5, further defined by a plurality of actuator sections, constructed according to the present invention, wherein actuator sections have overlapping torque-generating regions, to generate high torque and continuous angular motion when actuator sections are energized in sequence; comprising:

a vertical cylindrical cavity formed by top and bottom, vertically-spaced horizontal washer-shaped cores functioning as a plurality $N=4n$, where $n=1, 2, \ldots$, of said ferromagnetic high-field-energy cores, $2n$ said permanent magnets, substantially bar-shaped, length-wise magnetized and having a north and south pole, with axes positioned vertically, equally-spaced angularly with alternating poles, constrained and of dimension small enough to rotate within the vertical length of the defined cylindrical cavity with said poles moving along the inside top and bottom lateral surfaces of the washer-shaped cores, affixed by radial arms to a central member located on the vertical axis, such as a cylindrical journaled shaft, for transmitting mechanical torque to an external load, N said low-reluctance sources of magnetomotive force both at the top and bottom of the assembly, in the form of similar, but at least two times thicker washer-shaped circular ferromagnetic cores located in horizontal parallel planes, spaced vertically from said ferromagnetic high-field-energy cores in order to accommodate N coil means, and having N salient poles, equally-spaced angularly around the source washer interior lateral surface, for transmitting flux to the central high-field-energy cores, and adjustable or fixed mechanical stops, consisting of three respective layers of tough, energy-absorbing and rigid materials, located at the extremities of travel of the said permanent magnet.

* * * * *